United States Patent

Sugawara

(10) Patent No.: US 11,835,548 B2
(45) Date of Patent: Dec. 5, 2023

(54) VIBRATION COMPONENT MEASUREMENT DEVICE, KELVIN PROBE FORCE MICROSCOPE, AND VIBRATION COMPONENT MEASUREMENT METHOD

(71) Applicant: OSAKA UNIVERSITY, Osaka (JP)

(72) Inventor: Yasuhiro Sugawara, Osaka (JP)

(73) Assignee: OSAKA UNIVERSITY, Osaka (JP)

( * ) Notice: Subject to any disclaimer, the term of this patent is extended or adjusted under 35 U.S.C. 154(b) by 0 days.

(21) Appl. No.: 17/911,572

(22) PCT Filed: Mar. 25, 2021

(86) PCT No.: PCT/JP2021/012464
§ 371 (c)(1),
(2) Date: Sep. 14, 2022

(87) PCT Pub. No.: WO2021/193799
PCT Pub. Date: Sep. 30, 2021

(65) Prior Publication Data
US 2023/0110754 A1    Apr. 13, 2023

(30) Foreign Application Priority Data
Mar. 26, 2020    (JP) .................... 2020-056446

(51) Int. Cl.
*G01Q 60/30*        (2010.01)
*G01Q 60/32*        (2010.01)
*G01Q 30/20*        (2010.01)

(52) U.S. Cl.
CPC ............. *G01Q 60/30* (2013.01); *G01Q 30/20* (2013.01); *G01Q 60/32* (2013.01)

(58) Field of Classification Search
None
See application file for complete search history.

(56) References Cited

U.S. PATENT DOCUMENTS

2012/0313697 A1* 12/2012 Hafizovic ............ H03D 1/22
                                                    329/323
2013/0276174 A1* 10/2013 Li .................... B82Y 35/00
                                                    850/5

FOREIGN PATENT DOCUMENTS

EP        2275798 A1 *    1/2011    ............. G01Q 60/34

OTHER PUBLICATIONS

M. Nonnenmacher, M. P. O'Boyle, and H. K. Wickramasinghe, Kelvin probe force microscopy, Appl.Phys. Lett., 58(25), 1991, 2921-2923.

(Continued)

*Primary Examiner* — Eliza W Osenbaugh-Stewart
(74) *Attorney, Agent, or Firm* — Casimir Jones, SC; Robert A. Goetz

(57) ABSTRACT

In order to increase the order of a frequency of an AC signal to be applied between a vibration section and a sample to an order at substantially the same level as the order of a vibration frequency of the vibration section in measuring a vibration component of the vibration control section, a vibration component measuring device (2) includes: a vibration section (4); a first AC signal generator (20) configured to generate a first AC signal; a second AC signal generator (44) configured to generate a second AC signal having a frequency which is (a) more than one time and less than two times or (b) more than two times and less than three times as high as a frequency of the first AC signal; a signal applying section (14, 56) configured to apply the second AC signal between the vibration section and a sample (X); a vibration control section (10) configured to cause the vibration section to vibrate; and a measuring section (16, 18, 20, 22, 42, 44, 50) configured to measure a varying component of vibration of the vibration section, the varying component (Continued)

being varied by an interaction between the vibration section and the sample.

20 Claims, 16 Drawing Sheets

(56) References Cited

OTHER PUBLICATIONS

Written Opinion for PCT/JP2021/012464 and its English translation, (International Preliminary Report on Patentability), dated Jun. 1, 2021, 5 pages.

International Search Report for PCT/JP2021/012464 and its English translation, dated Jun. 1, 2021, 3 pages.

* cited by examiner

FIG. 14
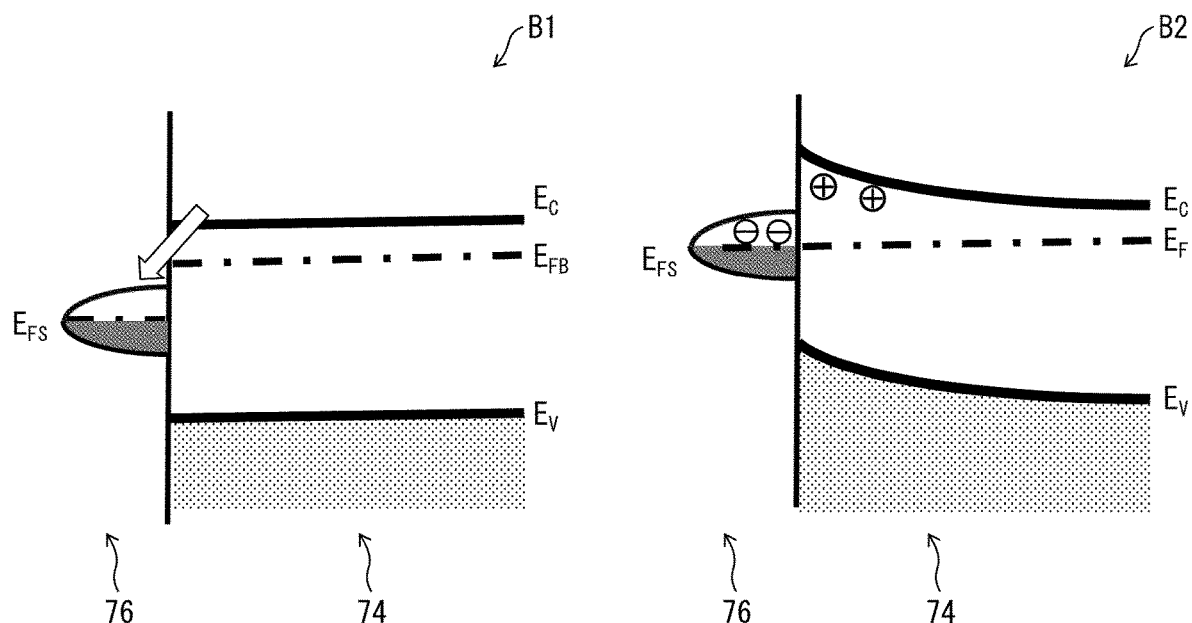
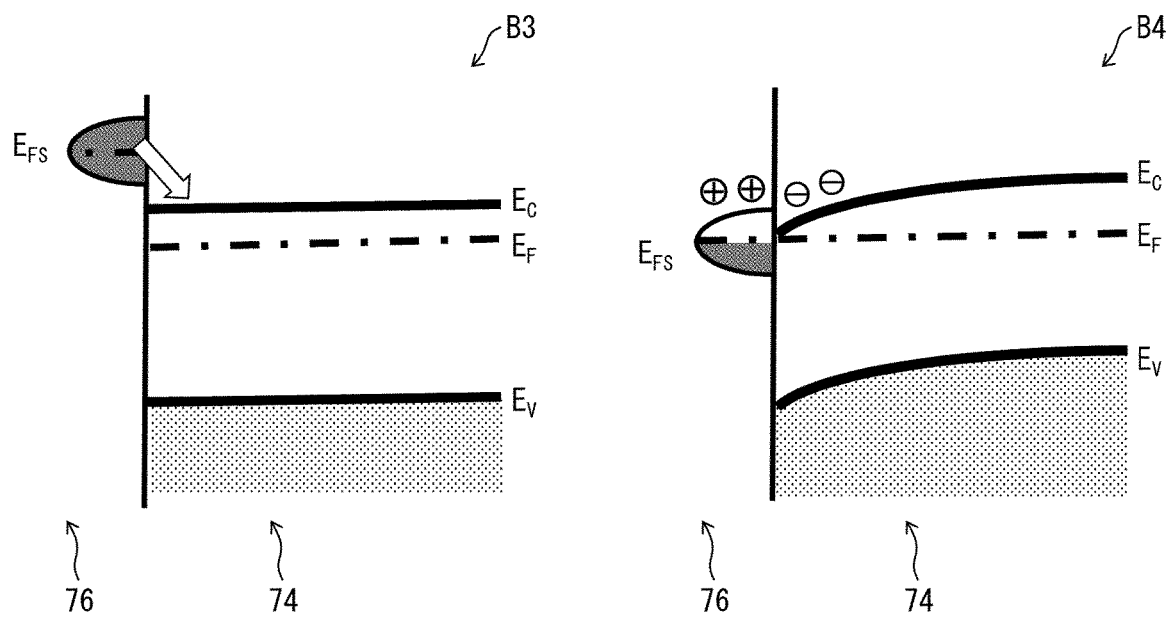

FIG. 15
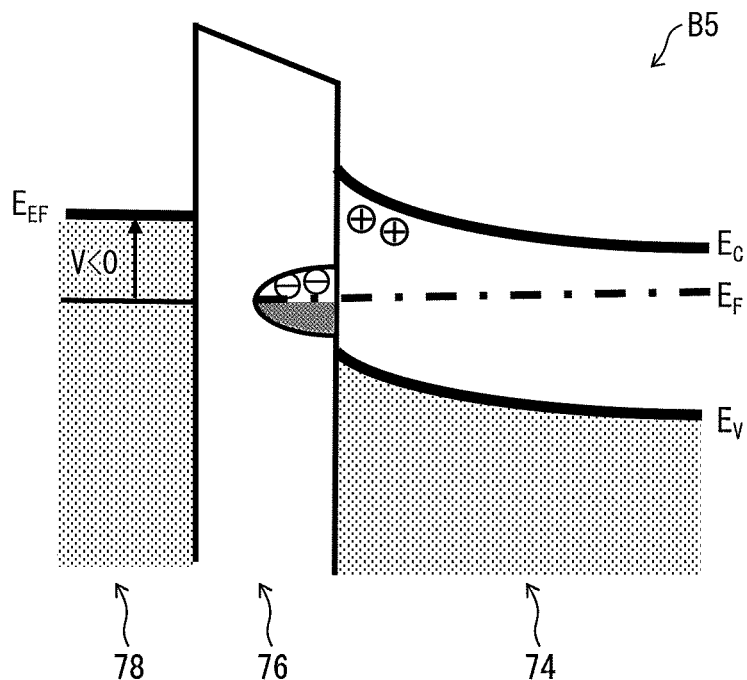
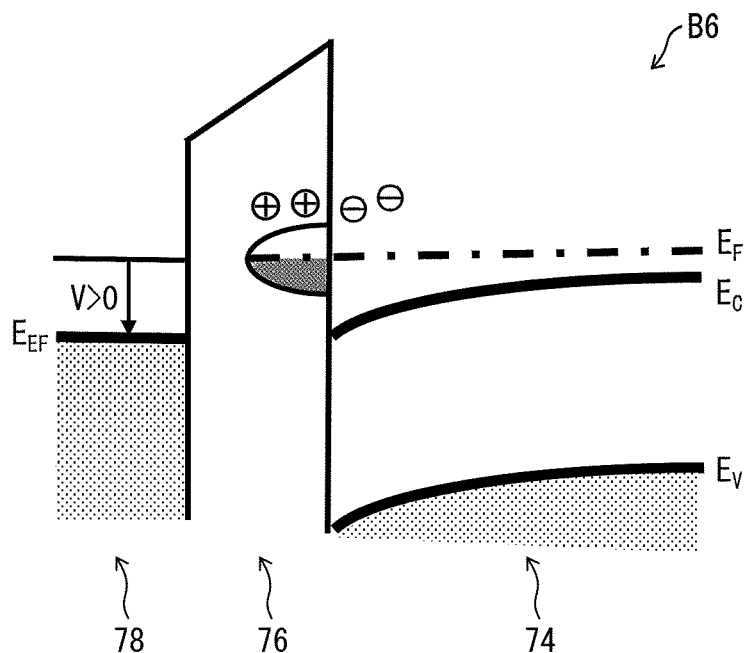

VIBRATION COMPONENT MEASUREMENT DEVICE, KELVIN PROBE FORCE MICROSCOPE, AND VIBRATION COMPONENT MEASUREMENT METHOD

TECHNICAL FIELD

The present invention relates to a method for measuring a varying component of vibration of a vibration section, and also to a device for realizing the method, in particular, to a microscope including the device.

BACKGROUND ART

Non-Patent Literature 1 below discloses a technique for measuring a structure of a surface of a sample and a local electric field at the surface of the sample. The technique makes such measurement by measuring a varying component of vibration of a cantilever probe while applying an alternating-current (AC) voltage between the sample and the cantilever probe which is vibrating.

CITATION LIST

Non-Patent Literature

[Non-patent Literature 1] M. Nonnenmacher, M. P. O'Boyle, and H. K. Wickramasinghe, Kelvin probe force microscopy, Appl. Phys. Lett., 58(25), 1991, 2921.

SUMMARY OF INVENTION

Technical Problem

In such a conventional measurement technique disclosed in Non-Patent Literature 1, increasing a frequency of the AC voltage that is applied between the cantilever probe and the sample leads to a drastic decrease in strength of a measurement signal which contains information on the varying component. Therefore, in the above measurement technique, in order to ensure a sufficient signal-to-noise (SN) ratio of the measurement signal, it is necessary to set the frequency of the AC voltage that is applied between the cantilever probe and the sample low.

Solution to Problem

A vibration component measuring device in accordance with an aspect of the present disclosure includes: a vibration section; a first AC signal generator configured to generate a first AC signal; a second AC signal generator configured to generate a second AC signal having a frequency which is (a) more than one time and less than two times or (b) more than two times and less than three times as high as a frequency of the first AC signal; a signal applying section configured to apply at least the second AC signal between the vibration section and a sample; a vibration control section configured to cause the vibration section to vibrate on the basis of the first AC signal; and a measuring section configured to measure a varying component of vibration of the vibration section, the varying component being varied by an interaction between the vibration section and the sample.

A method in accordance with an aspect of the present disclosure for measuring a vibration component, includes the steps of: generating a first AC signal for causing a vibration section to vibrate; generating a second AC signal having a frequency which is (a) more than one time and less than two times or (b) more than two times and less than three times as high as a frequency of the first AC signal; and measuring a varying component of vibration of the vibration section, the varying component being varied due to an interaction between the vibration section and a sample by causing the vibration section to vibrate on the basis of the first AC signal concurrently with application of the second AC signal between the vibration section and the sample.

Advantageous Effects of Invention

According to the present disclosure, it is possible to more efficiently measure a vibration component of a vibration section and at the same time to increase, to the order at substantially the same level as the order of a vibration frequency of the vibration section, the order of a frequency of an AC signal that is applied between the sample and the vibration section including a cantilever probe and the like.

BRIEF DESCRIPTION OF DRAWINGS

FIG. 14 shows band diagrams for illustrating how a band in a bulk of a sample bends depending on states of a surface of the sample.

FIG. 15 shows band diagrams for illustrating how band bending in a bulk of a sample varies due to variation of an external electric field.

DESCRIPTION OF EMBODIMENTS

Embodiment 1

Figure 1:
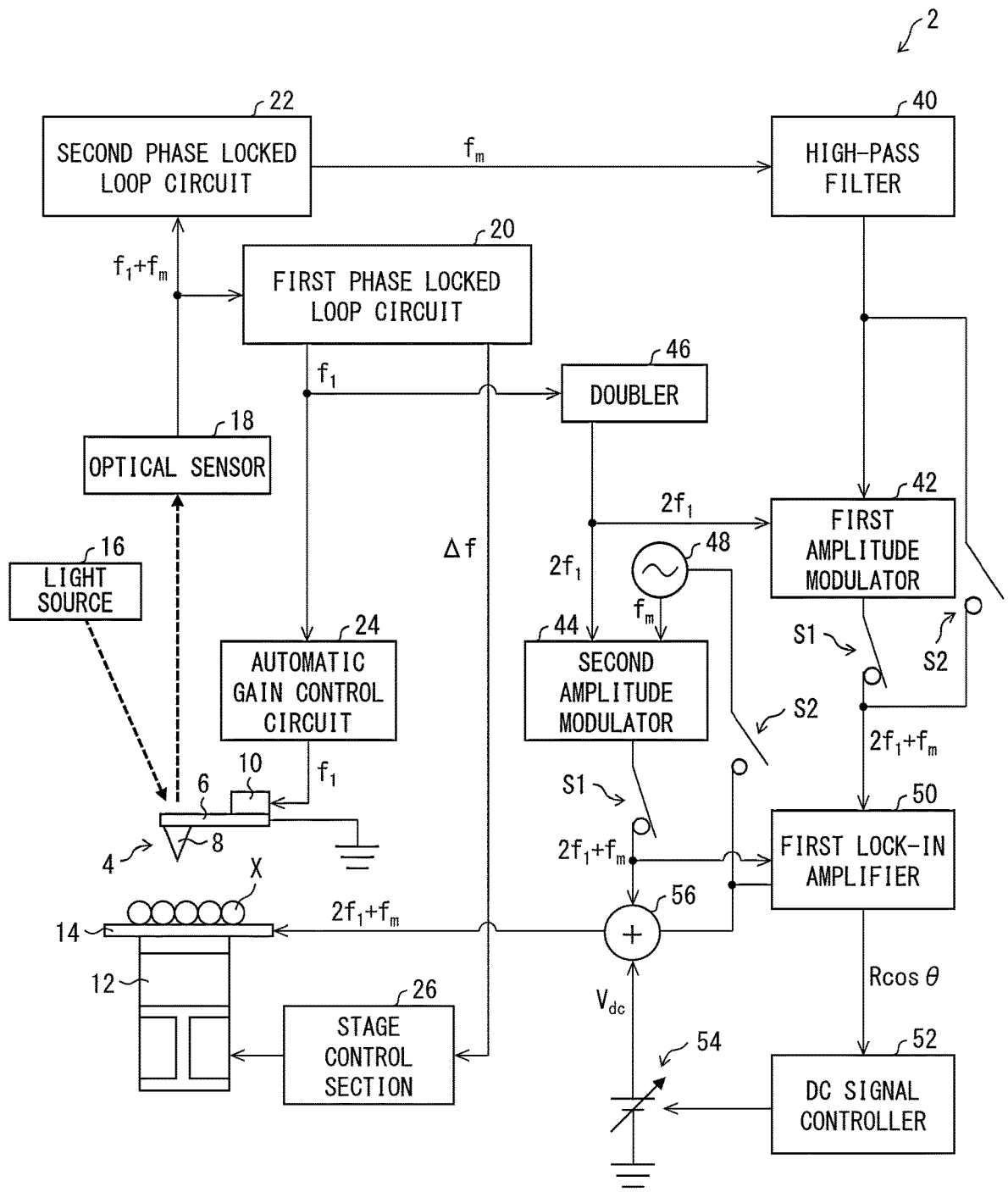
FIG. 1 is a block diagram for illustrating a configuration of a vibration component measuring device in accordance with Embodiment 1 and an operation of the vibration component measuring device.

The following description will discuss an embodiment according to the present disclosure, with reference to drawings. Note that the drawings which are used in the following description are schematic views and do not show exact dimensional ratios of members in the drawings.

FIG. 1 is a block diagram for illustrating a configuration of a vibration component measuring device 2 in accordance with Embodiment 1, and an operation of the vibration component measuring device 2. Note that the vibration component measuring device 2 in accordance with Embodiment 1 includes a plurality of first switches S1 and a plurality of second switches S2, which will be described later. In Embodiment 1, first, the following description will discuss, as an example, an operation of the vibration component measuring device 2 in a state in which the first switches S1 are closed while the second switches S2 are open.

<Cantilever Probe and Stage>

The vibration component measuring device 2 in accordance with the present embodiment includes a cantilever probe 4 as a vibration section. The cantilever probe 4 includes a cantilever part 6 and a probe part 8 that is formed at an end portion of the cantilever part 6. The vibration component measuring device 2 in accordance with Embodiment 1 is a device for measuring a vibration component of the cantilever probe 4. The vibration component measuring device 2 makes such measurement by bringing the probe part 8 close to a sample X while vibrating the cantilever part 6 of the cantilever probe 4.

Note that, in Embodiment 1, the following description will discuss, as an example, a method in which while the sample X and the cantilever probe 4 are kept in a non-contact state at all times, the vibration component of the cantilever probe 4 is measured. However, an embodiment of the present invention is not limited to such a method. For example, the vibration component of the cantilever probe 4 may be measured by using a technique that is generally referred to as a tapping mode. In this technique, the sample X and the cantilever probe 4 come into contact with each other intermittently due to the vibration of the cantilever probe 4. However, from the viewpoint of preventing damage to the sample X from occurring, it is preferable that the vibration component of the cantilever probe 4 be measured while the sample X and the cantilever probe 4 are kept in a non-contact state at all times.

The vibration component measuring device 2 includes a probe control section 10 as a vibration control section which vibrates the cantilever probe 4 at a vibration frequency corresponding to a frequency of an applied voltage. Specifically, in a case where the cantilever probe 4 has a resonant frequency which is a frequency $f_1$, a first AC signal which has the frequency $f_1$ is inputted to the probe control section 10.

The vibration component measuring device 2 includes a stage 12 for supporting the sample X, and a stage electrode 14 for applying voltage to the sample X. For example, as illustrated in FIG. 1, the stage electrode 14 and the sample X are made to be electrically conductive, and the cantilever probe 4 is grounded. In this configuration, when voltage is applied to the stage electrode 14, it is possible to apply, between the cantilever probe 4 and the sample X, a voltage equal to the voltage which is applied to the stage electrode 14.

Note that though details will be described later, a second AC signal is applied to the stage electrode 14 in Embodiment 1. The second AC signal has a frequency that is obtained by adding a frequency which is twice the frequency $f_1$ described above and a frequency $f_m$ which is lower than the frequency $f_1$. Though details will be described later, a direct-current (DC) signal which has a voltage $V_{dc}$ may be superimposed on the second AC signal.

<Detection of Vibration Component>

In Embodiment 1, the vibration component of the cantilever probe 4 is detected by using, for example, a so-called optical lever method with use of a light source 16 and an optical sensor 18 which are provided in the vibration component measuring device 2.

The light source 16 is, for example, a laser diode, and irradiates the cantilever probe 4 with light. Then, the optical sensor 18 is irradiated with the light with which the cantilever probe 4 is irradiated and which is reflected by the cantilever probe 4.

It should be noted here that the optical sensor 18 is an optical position sensor, and may be, for example, a quadrant photodiode. The vibration of the cantilever probe 4 varies a position where the optical sensor 18 is irradiated with the light reflected by the cantilever probe 4. Therefore, the optical sensor 18 can determine the vibration component of the cantilever probe 4 from a varying component at a position where the optical sensor 18 has received the light reflected by the cantilever probe 4.

For example, the optical sensor 18 calculates, for each vibration frequency of the cantilever probe 4, a vibration strength of the cantilever probe 4 on the basis of a periodic variation of the position where the optical sensor 18 receives the light and an intensity of the light which is received at each position. Further, the optical sensor 18 outputs a signal in accordance with a detection result. In Embodiment 1, the signal which is outputted by the optical sensor 18 is a signal obtained by replacing, with a signal strength for each frequency, the vibration strength of the cantilever probe 4 for each vibration frequency of the cantilever probe 4, the vibration strength having been calculated by the optical sensor 18.

<Signal Outputted by Optical Sensor>

Figure 2:
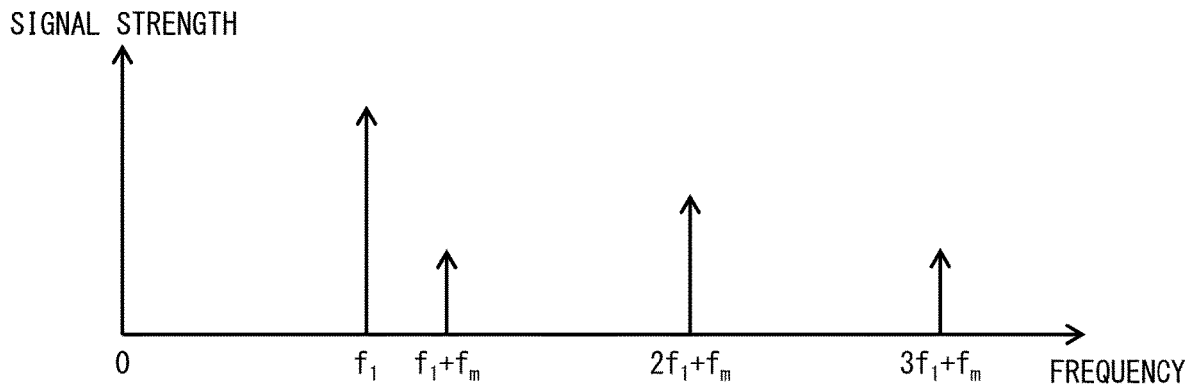
FIG. 2 is a graph showing a strength of a signal which an optical sensor in accordance with Embodiment 1 receives, at each frequency of the signal.

FIG. 2 is a graph which shows an example of a signal which is outputted by the optical sensor 18. In FIG. 2, the horizontal axis represents the frequency of the signal which is outputted by the optical sensor 18, and the vertical axis represents the intensity of the signal which is outputted by the optical sensor 18.

The signal which is outputted by the optical sensor 18 includes, as a main component, a component that has the frequency $f_1$ equivalent to the vibration frequency of the cantilever probe 4.

It should be noted here that the second AC signal of a frequency $2f_1+f_m$ is applied between the cantilever probe 4 and the sample X. Accordingly, an electrostatic interaction between the cantilever probe 4 and the sample X varies in accordance with this frequency. The vibration of the cantilever probe 4 thus has a component of the vibration frequency $2f_1+f_m$. Therefore, the signal which is outputted by the optical sensor 18 has a component at the frequency $2f_1+f_m$, as shown in FIG. 2.

Further, since the cantilever probe 4 vibrates at the vibration frequency $f_1$, the vibration of the cantilever probe 4 has, at the vibration frequency $f_1+f_m$ and the vibration frequency $3f_1+f_m$, side bands of a modulated component. Therefore, the signal which is outputted by the optical sensor 18 also has components at a frequency $f_1+f_m$ and a frequency $3f_1+f_m$ as shown in FIG. 2.

Further, in a case where there is a surface potential difference between the probe part 8 of the cantilever probe 4 and the sample X that faces the probe part 8, there occurs a change in electrostatic interaction between the cantilever probe 4 and the sample X due to the surface potential difference. Specifically, the surface potential difference changes depending on a contact potential difference between the cantilever probe 4 and the sample X or on a charge distribution on the sample X. The change in the electrostatic interaction between the cantilever probe 4 and the sample X due to the surface potential difference causes the vibration frequency of the cantilever probe 4 to be shifted by $\Delta f$. Furthermore, the varying component of the vibration of the cantilever probe 4 is observed as changes in amplitude R and phase θ in a side band of the modulated component of the signal which has been outputted by the optical sensor 18.

In other words, in Embodiment 1, it is possible to measure the surface potential difference between the cantilever probe 4 and the sample X by observing the changes in the amplitude R and the phase θ in the side band of the modulated component of the vibration of the cantilever probe 4.

Note that a signal in the above-described side band of the modulated component of the vibration of the cantilever probe 4 may be a signal in the case of an upper side band or in the case of a lower side band. In other words, $f_m$ may take either a positive value or a negative value.

Note that, in a case where the frequency of the second AC signal is increased with respect to the vibration frequency of the cantilever probe 4, the side band of the modulated component of the vibration of the cantilever probe 4 has a drastically decreased intensity. Accordingly, in a case where the frequency of the second AC signal is simply increased, it may be difficult to observe the side band because the side band is buried in white noise.

However, in a case where the frequency of the second AC signal is increased to a frequency of approximately twice the vibration frequency of the cantilever probe 4, there is an increase in the intensity of the side band of the modulated component of the vibration of the cantilever probe 4. Accordingly, in a case where the frequency of the second AC signal is increased to a frequency approximately twice the vibration frequency of the cantilever probe 4, measurement can be more easily carried out since the intensity of the side band increases.

In Embodiment 1, the frequency of the second AC signal is a frequency obtained by adding a frequency $f_m$ that is lower than the frequency $f_1$ to a frequency that is twice the frequency $f_1$ equivalent to the vibration frequency of the cantilever probe 4. Therefore, the frequency of the second AC signal becomes a frequency approximately twice the vibration frequency of the cantilever probe 4, so that it becomes possible to make the modulated component of the vibration of the cantilever probe 4 sufficiently strong.

<First Phase Locked Loop Circuit and Automatic Gain Control Circuit>

The signal which has been outputted from the optical sensor 18 is inputted to a first phase locked loop circuit 20 and a second phase locked loop circuit 22, which are provided in the vibration component measuring device 2. The first phase locked loop circuit 20 further generates a signal on the basis of the signal thus inputted, and inputs the signal thus generated to the automatic gain control circuit 24 and a stage control section 26, which are provided in the vibration component measuring device 2.

Figure 3:
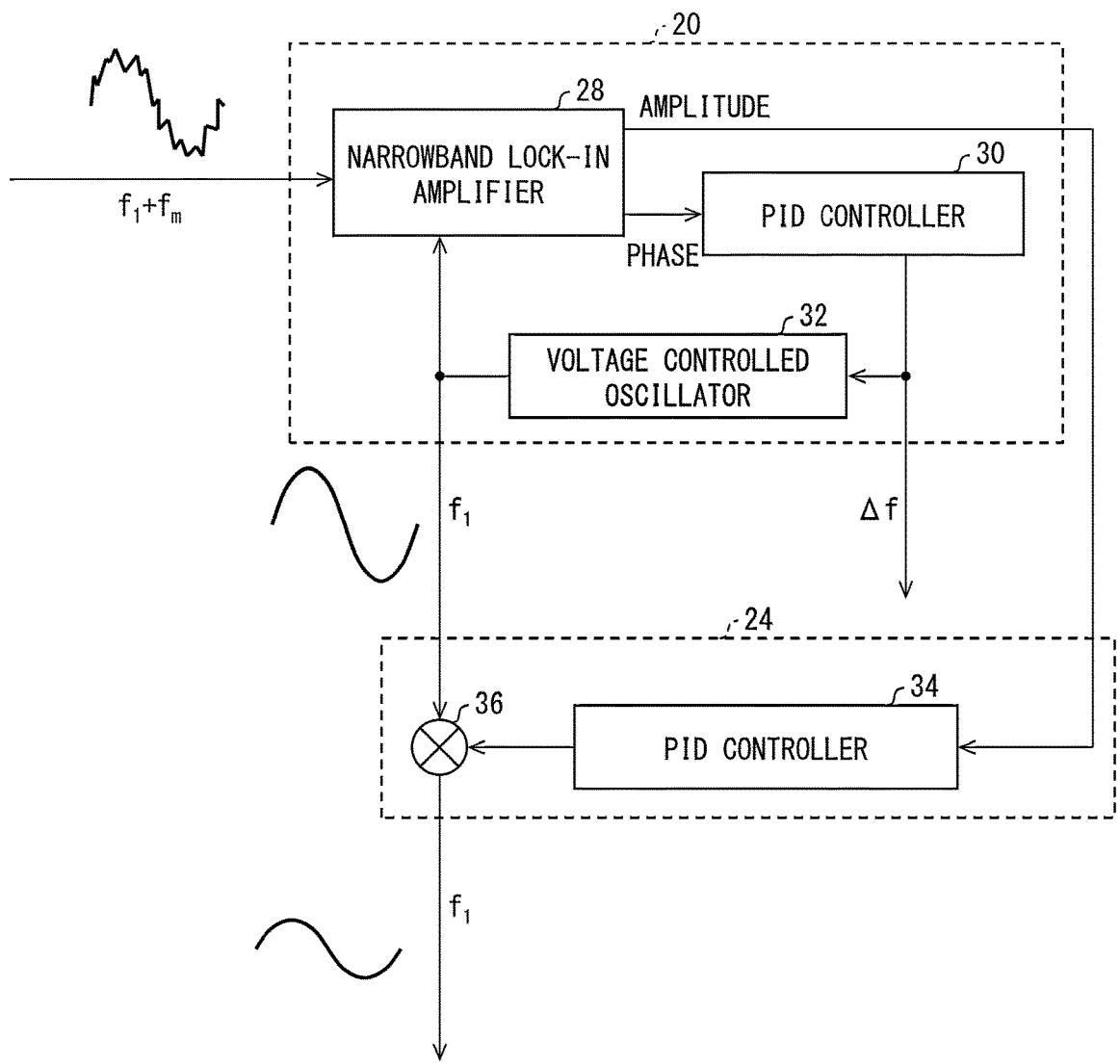
FIG. 3 is a block diagram for illustrating respective configurations of a first phase locked loop circuit and an automatic gain control in accordance with Embodiment 1.
Figure 4:
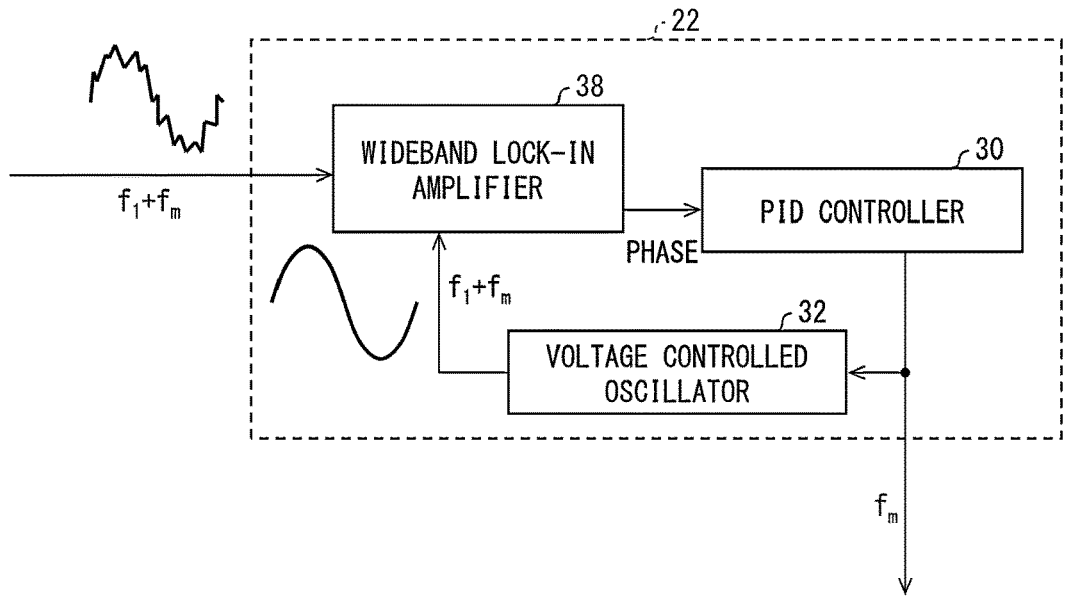
FIG. 4 is a block diagram for illustrating a configuration of a second phase locked loop circuit in accordance with Embodiment 1.

The following description will discuss a configuration and an operation of each of the first phase locked loop circuit 20 and the second phase locked loop circuit 22, with reference to FIGS. 3 and 4.

FIG. 3 is a block diagram for illustrating the configuration and the operation of the first phase locked loop circuit 20. Note that with reference to FIG. 3, the following description will also discuss the automatic gain control circuit 24. To the automatic gain control circuit 24, some of signals which are outputted from the first phase locked loop circuit 20 illustrated in FIG. 1 are inputted.

The first phase locked loop circuit 20 includes a narrowband lock-in amplifier 28, a PID controller 30, and a voltage controlled oscillator 32. The automatic gain control circuit 24 includes a PID controller 34, and a multiplier 36.

The signal which has been inputted to the first phase locked loop circuit 20 from the optical sensor 18 is inputted to the narrowband lock-in amplifier 28. The narrowband lock-in amplifier 28 is used as a phase comparator. The phase comparator makes a comparison of phases between the signal which has been inputted from the optical sensor 18 and a criterion signal which is inputted from the voltage controlled oscillator 32 that will be described later in detail. In Embodiment 1, the narrowband lock-in amplifier 28 outputs respective signals obtained by replacing, with voltages, a phase difference and an amplitude difference between the signal from the optical sensor 18 and the criterion signal.

Specifically, the narrowband lock-in amplifier 28 includes a multiplier for multiplying the two signals which have been inputted, and a low-pass filter for extracting only a low-frequency component out of the signals which have been generated by the multiplier. Therefore, in the narrowband lock-in amplifier 28, though the multiplier outputs (i) a high frequency wave that has a frequency equivalent to the sum of frequencies of the two signals which have been inputted and (ii) a low frequency wave which has a frequency equivalent to a difference between the frequencies of the two signals, only the low frequency wave is extracted by the low-pass filter.

The signal outputted from the narrowband lock-in amplifier 28 has been obtained by replacing, with a voltage, the phase difference between the signal from the optical sensor 18 and the criterion signal, and is then inputted to the voltage controlled oscillator 32 via the PID controller 30. The voltage controlled oscillator 32 outputs a signal which has a certain frequency, on the basis of the signal which has been outputted from the PID controller 30.

The voltage controlled oscillator 32 may be, for example, a voltage controlled crystal oscillator (VCXO), which includes a crystal oscillator as a resonator. In Embodiment 1, the voltage controlled oscillator 32 generates the first AC signal which has the frequency $f_1$ on the basis of the signal that has been inputted from the PID controller 30. In other words, the resonator of the voltage controlled oscillator 32 oscillates at the frequency $f_1$.

The PID controller 30 gives feedback to the voltage controlled oscillator 32 so that a phase of the first AC signal which is outputted by the voltage controlled oscillator 32 is shifted by π/2 from a frequency $f_1$ component of the signal which is inputted to the first phase locked loop circuit 20 from the optical sensor 18.

Therefore, among the signals which are outputted from the narrowband lock-in amplifier 28, the signal obtained by replacing, with a voltage, the phase difference between the signal from the optical sensor 18 and the first AC signal has a frequency equivalent to a difference between respective frequencies of the signal from the optical sensor 18 and the first AC signal. Further, among the signals which are outputted from the narrowband lock-in amplifier 28, a signal obtained by replacing, with a voltage, an amplitude difference between the signal from the optical sensor 18 and the first AC signal has an amplitude equivalent to a difference between respective amplitudes of the signal from the optical sensor 18 and the first AC signal.

Among the signals which are outputted from the narrowband lock-in amplifier 28, the signal obtained by replacing, with a voltage, the amplitude difference between the signal from the optical sensor 18 and the first AC signal is inputted to the multiplier 36 via the PID controller 34 of the automatic gain control circuit 24. Further, the first AC signal which has been outputted from the voltage controlled oscillator 32 is inputted to the multiplier 36, and multiplied by the signal from the PID controller 34.

The PID controller 34 thus gives feedback on a gain of the first AC signal which is outputted from the voltage controlled oscillator 32, on the basis of the signal from the narrowband lock-in amplifier 28. As a result, the amplitude of the first AC signal which is outputted from the automatic gain control circuit 24 is kept substantially constant.

As illustrated in FIG. 1, the first AC signal which has been outputted from the automatic gain control circuit 24 is applied to the probe control section 10. Since the feedback on the amplitude of the first AC signal is given by the automatic gain control circuit 24, the first AC signal having the amplitude that is substantially constant is inputted to the probe control section 10. Therefore, the first phase locked loop circuit 20 functions as a first AC signal generator that generates the first AC signal.

The first phase locked loop circuit 20 thus detects the vibration frequency of the cantilever probe 4, and generates the first AC signal on the basis of the vibration frequency. Accordingly, it is not necessary to separately prepare a device that generates the first AC signal. The first phase locked loop circuit 20 can continuously generate the first AC signal after the cantilever probe 4 is once oscillated.

The measurement signal generator and the first AC signal generator, which are provided in the vibration component measuring device 2, includes a common first phase locked loop circuit 20. This allows the first phase locked loop circuit 20 not only to continuously generate the first AC signal, but also to generate the measurement signal. This makes it possible to reduce the number of circuits which are provided in the vibration component measuring device 2, and leads to simplification of the vibration component measuring device 2.

<Second Phase Locked Loop Circuit>

FIG. 4 is a block diagram for illustrating the configuration and the operation of the second phase locked loop circuit 22. The second phase locked loop circuit 22 includes a PID controller 30 and a voltage controlled oscillator 32 as in the first phase locked loop circuit 20. On the other hand, as compared with the first phase locked loop circuit 20, the second phase locked loop circuit 22 includes a wideband lock-in amplifier 38 in place of the narrowband lock-in amplifier 28.

Signals which have been inputted to the second phase locked loop circuit 22 from the optical sensor 18 are inputted to the wideband lock-in amplifier 38. The wideband lock-in amplifier 38, as compared to the narrowband lock-in amplifier 28, has the same configuration except for including a low-pass filter that has a wide band. Therefore, like the narrowband lock-in amplifier 28, the wideband lock-in amplifier 38 outputs respective signals obtained by replacing, with voltages, a phase difference and an amplitude difference between the signal from the optical sensor 18 and a criterion signal.

The PID controller 30 and the voltage controlled oscillator 32 which are provided in the second phase locked loop circuit 22 has the same function as the PID controller 30 and the voltage controlled oscillator 32 which are provided in the first phase locked loop circuit 20, respectively. In other words, the PID controller 30 outputs, from the signal which has been inputted from the wideband lock-in amplifier 38, a signal which has a frequency equivalent to a difference between a frequency of the signal from the optical sensor 18 and a frequency of the criterion signal. However, for a reason that will be described later, in the second phase locked loop circuit 22, the voltage controlled oscillator 32 generates a signal which has a frequency $f_1+f_m$ on the basis of the signal that has been inputted from the PID controller 30, and inputs the signal thus generated to the wideband lock-in amplifier 38.

<Signals Outputted from Phase Locked Loop Circuits>

As illustrated in FIG. 2, the signal which is outputted from the optical sensor 18 includes a component at the frequency $f_1$ and a component at the frequency $f_1+f_m$. Accordingly, the signal that has the component at the frequency $f_1$ is inputted to the narrowband lock-in amplifier 28 and the signal that has the component at the frequency $f_1+f_m$ is inputted to the wideband lock-in amplifier 38.

Therefore, the signal which has been inputted to the narrowband lock-in amplifier 28 is compared with the first AC signal which has the frequency $f_1$. It should be noted here that in the narrowband lock-in amplifier 28, the low-pass filter has a sufficiently narrow band. Therefore, the PID controller 30 of the first phase locked loop circuit 20 outputs a signal which has a DC component. The signal which has the DC component has a strength corresponding to a magnitude of a frequency shift Δf of the vibration of the cantilever probe 4 due to the electrostatic interaction between the cantilever probe 4 and the sample X.

On the other hand, the signal which has been inputted to the wideband lock-in amplifier 38 is compared with the first AC signal which has the frequency $f_1+f_m$. It should be noted here that, in the wideband lock-in amplifier 38, as compared to the narrowband lock-in amplifier 28, the low-pass filter has a wider band. Accordingly, the PID controller 30 of the second phase locked loop circuit 22 outputs a signal which has the component at the frequency $f_m$ in addition to the DC component. The second phase locked loop circuit 22 therefore outputs a measurement signal that includes a component which has a frequency $f_m$. This component at the frequency $f_m$ includes a varying component of the vibration of the cantilever probe 4. Note that since the voltage controlled oscillator 32 of the second phase locked loop circuit 22 oscillates on the basis of the signal which has the component at the frequency $f_m$ in addition to the DC component, the voltage controlled oscillator 32 outputs a signal which has the frequency $f_1+f_m$.

From the foregoing description, the vibration component measuring device 2 includes, as the measurement signal generator that generates the measurement signal, the light source 16, the optical sensor 18, the first phase locked loop circuit 20 and the second phase locked loop circuit 22.

Figure 5:
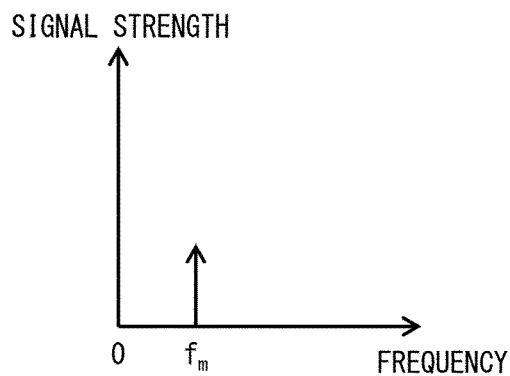
FIG. 5 is a graph showing a strength of a signal that is inputted to a first amplitude modulator in accordance with Embodiment 1, at each frequency of the signal.

It should be noted here that the measurement signal which is outputted from the second phase locked loop circuit 22 is inputted to a high-pass filter 40, as illustrated in FIG. 1. The high-pass filter 40 removes the DC component from the signal thus inputted. Therefore, the high-pass filter 40 outputs a measurement signal which has only the component at the frequency $f_m$, as shown in a graph of FIG. 5.

In addition, the signal which is outputted from the optical sensor 18 includes the component at the frequency $2f_1+f_m$ and the component at the frequency $3f_1+f_m$. However, in Embodiment 1, the narrowband lock-in amplifier 28 outputs, via the low-pass filter, only a signal which has a component at a frequency in the vicinity of the frequency of the DC component, as described above. In addition, the wideband lock-in amplifier 38 is also configured to output, via the low-pass filter, only a signal which has a component at a frequency that is not higher than the frequency $f_m$.

<Feedback to Stage>

Among the measurement signals which have been outputted from the first phase locked loop circuit 20, the signal which has the DC component is inputted to the stage control section 26. The stage control section 26 controls a position of the stage 12 on the basis of the measurement signal. This allows the stage control section 26 to control a position of the probe part 8 above the sample X and a distance between the sample X and the probe part 8.

For example, in Embodiment 1, the distance between the sample X and the probe part 8 is controlled by the stage control section 26. This allows the stage control section 26 to give feedback so that among frequencies of the measurement signals, the value of a vibration frequency shift $\Delta f$ can be constant, the vibration frequency shift $\Delta f$ being equivalent to the frequency shift of the vibration of the cantilever probe 4. In a case where the distance between the sample X and the probe part 8 is constant while the cantilever probe 4 is not vibrating, the vibration frequency shift $\Delta f$ is constant. Therefore, while the vibration frequency shift $\Delta f$ is kept constant, the probe part 8 performs scanning on the sample X and a position on the stage 12 is sequentially recorded, so that the vibration component measuring device 2 can measure a surface shape of the sample X.

Note that the stage control section 26 may include a filter for filtering the measurement signals which have been outputted from the first phase locked loop circuit 20. In this case, in Embodiment 1, since a lock-in amplifier which is provided in the first phase locked loop circuit 20 has a narrower band than a lock-in amplifier which is provided in the second phase locked loop circuit 22, the filter which is provided in the stage control section 26 may have a wide band.

Since the filter which is provided in the stage control section 26 has a wide band, the feedback control of the stage 12 by the stage control section 26 can be performed more quickly. However, in a case where the filter which is provided in the stage control section 26 is arranged to have a narrow band, the lock-in amplifier which is provided in the first phase locked loop circuit 20 may have a wider band than the lock-in amplifier which is provided in the second phase locked loop circuit 22.

<Amplitude Modulator>

In Embodiment 1, the vibration component measuring device 2 measures, by using an amplitude modulator, the vibration component of the cantilever probe 4 from the measurement signal. The following description will discuss, together with a configuration of the amplitude modulator, a technique for measuring the vibration component of the cantilever probe 4 with use of the amplitude modulator.

The vibration component measuring device 2 includes a first amplitude modulator 42 and a second amplitude modulator 44, as illustrated in FIG. 1. The first amplitude modulator 42 and the second amplitude modulator 44 are each, for example, a single sideband modulator (SSB modulator).

The first amplitude modulator 42 and the second amplitude modulator 44 each include a multiplier, and generate (i) a signal which has a frequency obtained by adding up respective frequencies of two signals that have been inputted, and (ii) a signal which has a frequency obtained by subtracting a frequency of one of the two signals that have been inputted from a frequency of the other one of the two signals. The first amplitude modulator 42 and the second amplitude modulator 44 each may generate (i) a signal obtained by adding up respective amplitudes of two signals that have been inputted, and (ii) a signal which has an amplitude obtained by subtracting an amplitude of one of the two signals that have been inputted from an amplitude of the other one of the two signals.

Note that, in Embodiment 1, the first amplitude modulator 42 and the second amplitude modulator 44 each extract, from the above two signals, only the signal which has a frequency obtained by adding up the respective frequencies of the two signals that have been inputted, and output the signal thus extracted.

To the first amplitude modulator 42 and the second amplitude modulator 44, a double frequency signal which has a frequency that is twice the frequency $f_1$ of the first AC signal is inputted. In Embodiment 1, the double frequency signal is generated by a doubler 46 that is provided in the vibration component measuring device 2.

The doubler 46 serves as a double frequency generator which outputs a signal having a frequency twice the frequency of the signal that has been inputted. In Embodiment 1, the first AC signal which has been outputted from the voltage controlled oscillator 32 of the first phase locked loop circuit 20 is inputted to the doubler 46 via the first switch S1. Therefore, the doubler 46 outputs a double frequency signal which has a frequency of $2f_1$ that is twice the frequency $f_1$ of the first AC signal. The double frequency signal from the doubler 46 is inputted to the first amplitude modulator 42 and the second amplitude modulator 44.

Figure 6:
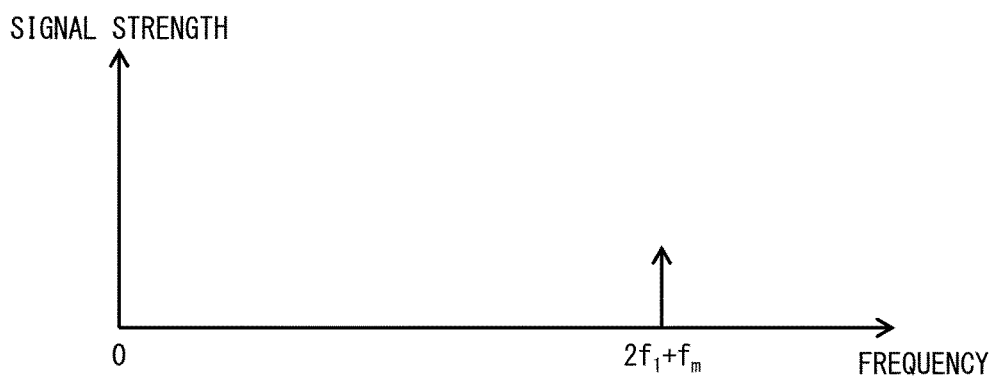
FIG. 6 is a graph showing a strength of a signal which is inputted to a first lock-in amplifier in accordance with Embodiment 1, at each frequency of the signal.

Furthermore, to the first amplitude modulator 42, the measurement signal which has been outputted from the high-pass filter 40 is inputted. The first amplitude modulator 42 multiplies those two inputted signals with use of the multiplier. Accordingly, the first amplitude modulator 42 generates (i) a signal which has a frequency $2f_1+f_m$ obtained by adding up the frequency of the double frequency signal and the frequency of the measurement signal, and (ii) a signal which has a frequency $2f_1-f_m$ obtained by subtracting the frequency of the measurement signal from the frequency of the double frequency signal It should be noted here that, in Embodiment 1, the first amplitude modulator 42 extracts the signal which has the frequency $2f_1+f_m$ obtained by adding up the frequency of the double frequency signal and the frequency of the measurement signal, as shown in FIG. 6, and outputs, as a comparison signal, the signal thus extracted.

On the other hand, to the second amplitude modulator 44, a reference AC signal is inputted. This reference AC signal is outputted from an AC power source 48 that is provided in the vibration component measuring device 2. The AC power source 48 outputs the reference AC signal which has the frequency $f_m$. In other words, the vibration component measuring device 2 includes the AC power source 48, as a reference AC generator that generates the reference AC signal.

Therefore, the second amplitude modulator 44 generates the second AC signal that has the frequency $2f_1+f_m$, which is obtained by adding up the frequency of the double frequency signal and the frequency of the reference AC signal. The second amplitude modulator 44 inputs, as a reference signal, the second AC signal to the first lock-in amplifier 50.

In other words, the vibration component measuring device 2 includes the second amplitude modulator 44 as a second AC signal generator that generates the second AC signal. This allows the second AC signal to be generated, by the second amplitude modulator 44, from the double frequency signal which has been generated by the doubler 46 and the reference AC signal from the AC power source 48. As a result, it is possible to generate the second AC signal in a simple configuration.

Note that the vibration component measuring device 2 may include, as the double frequency generator in place of the doubler 46, (i) an oscillator which oscillates at the frequency of the double frequency signal or (ii) a phase locked loop circuit which includes a frequency demultiplier that has a frequency dividing rate of 2. The double frequency signal can be generated also by the oscillator or the phase locked loop circuit.

<Measurement of Varying Component>

The vibration component measuring device 2 in accordance with Embodiment 1 includes a first lock-in amplifier 50, which compares the above-described comparison signal and the reference signal. The first lock-in amplifier 50 may include the same configuration as the narrowband lock-in amplifier 28 or the wideband lock-in amplifier 38 except for the band of the low-pass filter.

In Embodiment 1, to the first lock-in amplifier 50, the comparison signal from the first amplitude modulator 42 and the reference signal from the second amplitude modulator 44 are inputted. In Embodiment 1, the first lock-in amplifier 50 outputs a signal which contains a synchronous demodulation component $R\cos\theta$ as a result of a comparison between the comparison signal from the first amplitude modulator 42 and the reference signal from the second amplitude modulator 44.

It should be noted here that, in the synchronous demodulation component $R\cos\theta$, the value of R corresponds to an amplitude of the comparison signal, and the value of θ corresponds to a phase difference of the comparison signal with respect to the reference signal. Therefore, the synchronous demodulation component $R\cos\theta$ of the signal which is outputted from the first lock-in amplifier 50 corresponds to the varying component which is a component of the vibration of the cantilever probe 4 and which is generated by the surface potential difference between the sample X and the probe part 8. In other words, the surface potential difference between the sample X and the probe part 8 can be measured from the signal which is outputted from the first lock-in amplifier 50.

Note that the band of the low-pass filter of the first lock-in amplifier 50 may be wide enough to remove a high frequency wave which has a frequency $4f_1+2f_m$ and which has been generated by multiplying the comparison signal by the reference signal.

<Feedback of Second AC Signal>

In Embodiment 1, the vibration component measuring device 2 further includes, as a DC signal generator, a DC signal controller 52 and a DC power source 54. To the DC signal controller 52, the signal that has the synchronous demodulation component $R\cos\theta$ is inputted. This signal is outputted from the first lock-in amplifier 50. The DC power source 54 generates a DC signal which has a voltage $V_{dc}$. It should be noted here that the DC signal controller 52 controls the magnitude of the voltage $V_{dc}$ of the DC signal which is generated by the DC power source 54 on the basis of the signal from the first lock-in amplifier 50.

The DC signal from the DC power source 54 is inputted to the adder 56 which is provided in the vibration component measuring device 2. Further, the second AC signal is also inputted to the adder 56. The second AC signal has the frequency $2f_1+f_m$ and has been outputted from the second amplitude modulator 44. The adder generates a signal in which the second AC signal, which is an AC signal that has a frequency $2f_1+f_m$, and the DC signal are superimposed on each other by adding up the reference signal and the DC signal that has been inputted. The adder 56 applies the signal thus generated to the stage electrode 14. Therefore, the signal which the adder 56 applies to the stage electrode 14 includes at least the second AC signal. In other words, the adder 56 and the stage electrode 14 serve as a signal applying section that applies at least the second AC signal between the sample X and the cantilever probe 4.

In Embodiment 1, the DC signal controller 52 gives feedback to the DC power source 54 so that, for example, the signal which is inputted from the first lock-in amplifier can be a DC signal, in other words, so that the synchronous demodulation component $R\cos\theta$ can be 0. The synchronous demodulation component $R\cos\theta$ being 0 means that in a case where the AC signal is not applied, the sample X and the cantilever probe 4 have the same surface potential.

When the sample X and the cantilever probe 4 are each grounded, the surface potential difference between the sample X and the cantilever probe 4 is equivalent to the contact potential difference, in other words, equivalent to the difference in work function between the sample X and the cantilever probe 4. On the other hand, in a case where a surface charge is present on the sample X, the surface potential difference between the sample X and the cantilever probe 4 changes according to a magnitude and a polarity of the surface charge.

It is thus possible to measure the magnitude and the polarity of the surface charge on the sample X, by measuring the surface potential difference between the sample X and the cantilever probe 4 and comparing the surface potential difference with the difference in work function between the sample X and the cantilever probe 4. Therefore, the vibration component measuring device 2 can measure a surface potential distribution of the sample X by keeping the value of the synchronous demodulation component $R\cos\theta$ at 0, causing the probe part 8 to perform scanning on the sample X, and sequentially recording the magnitude of voltage $V_{dc}$.

Note that the vibration component measuring device 2 may apply, to the sample X, only the second AC signal without applying the DC signal. In this case, the DC signal controller 52 and the DC power source 54 are not necessarily required. For example, in a case where the sample X is a solution, it may be preferable not to apply a DC voltage to the sample X in order to prevent an electrochemical reaction of the sample X. In this case, the vibration component measuring device 2 can measure the surface potential distribution of the sample X by causing the probe part 8 to perform scanning on the sample X and recording the value of the synchronous demodulation component $R\cos\theta$.

In addition, with regard to feedback by the stage control section 26 for making the vibration frequency shift $\Delta f$ constant and feedback by the DC signal controller 52 for making the synchronous demodulation component $R\cos\theta$ become 0, the latter requires a longer time. Therefore, it is preferable that the second phase locked loop circuit 22 include a lock-in amplifier which has a wider band as compared with the first phase locked loop circuit 20, from the viewpoint of increasing the speed of feedback with respect to the magnitude of the voltage $V_{dc}$ and increasing the speed of an operation of a whole of the vibration component measuring device 2.

<Effects Yielded by Vibration Component Measuring Device>

The vibration component measuring device 2 in accordance with Embodiment 1 causes the cantilever probe 4 to vibrate on the basis of the frequency of the first AC signal. The vibration component measuring device 2 also applies the second AC signal between the sample X and the cantilever probe 4. In the above-described state, the vibration component measuring device 2 measures the varying component which is a component of the vibration of the cantilever probe 4 and which varies due to an interaction between the sample X and the cantilever probe 4.

It should be noted here that the frequency of the second AC signal is a frequency obtained by adding, to a frequency that is twice the frequency of the first AC signal, the frequency of the reference AC signal lower than the frequency of the first AC signal. In other words, the second AC signal has a frequency which is more than two times and less than three times as high as the frequency of the first AC signal. Therefore, the vibration component measuring device 2 can apply a high frequency wave between the sample X and the cantilever probe 4 while ensuring that the side band of the modulated component of the vibration of the cantilever probe 4 has the intensity necessary for measurement of the varying component of the vibration of the cantilever probe 4.

Accordingly, the vibration component measuring device 2 can measure the varying component of the vibration of the cantilever probe 4 while applying, between the sample X and the cantilever probe 4, a high frequency wave whose order is at substantially the same level as the order of the vibration frequency of the cantilever probe 4. The vibration component measuring device 2 can measure, for example, a variation of the interaction between the sample X and the cantilever probe 4 in a case where a high frequency wave is applied to the sample X. In other words, the vibration component measuring device 2 can measure behavior of the sample X in a case where a high frequency wave is applied to the sample X.

Meanwhile, a method for measuring the vibration component of the cantilever probe 4 in accordance with Embodiment 1 includes the step of generating the first AC signal for causing the cantilever probe 4 to vibrate. Furthermore, this measurement method includes the step of generating the second AC signal which has a frequency obtained by adding, to a frequency that is twice the frequency of the first AC signal, the frequency of the reference AC signal lower than the frequency of the first AC signal. In addition, the measurement method includes the step of measuring the varying component of the vibration of the cantilever probe 4 by causing the cantilever probe 4 to vibrate concurrently with application of the second AC signal between the cantilever probe 4 and the sample X.

The above measurement method makes it possible to measure the varying component of the vibration of the cantilever probe 4 while applying, between the sample X and the cantilever probe 4, a high frequency wave whose order is at substantially the same level as the order of the vibration frequency of the cantilever probe 4. The measurement method can be implemented by operating, with the above-described technique, the vibration component measuring device 2 in accordance with Embodiment 1.

The vibration component measuring device 2 in accordance with Embodiment 1 includes, as a measuring section that measures the varying component of the vibration of the cantilever probe 4, the first amplitude modulator 42, the second amplitude modulator 44, and the first lock-in amplifier 50 in addition to the above-described measurement signal generator. This allows the vibration component measuring device 2 to measure the varying component of the vibration of the cantilever probe 4 by comparing the reference signal which has the same frequency as the second AC signal with the comparison signal which has been generated on the basis of the measurement signal.

In the first lock-in amplifier 50, the time required to compare the reference signal with the comparison signal depends on a cycle of the reference signal which is inputted to the first lock-in amplifier 50. Accordingly, the time required for a comparison between the reference signal and the comparison signal in the first lock-in amplifier 50 can be shortened by increasing the frequency of the reference signal. Therefore, the vibration component measuring device 2 in accordance with Embodiment 1 can shorten the time required for measuring the varying component of the vibration of the cantilever probe 4.

The band of the low-pass filter which is provided in the first lock-in amplifier 50 may have any range in which it is possible to remove a high frequency wave that is generated from the reference signal and the comparison signal. Since the reference signal and the comparison signal are high frequency waves, it is possible to further widen the band of the low-pass filter which is provided in the first lock-in amplifier 50. Therefore, it is possible to further shorten the time required for the comparison between the reference signal and the comparison signal in the first lock-in amplifier 50, and the low-pass filter which is provided in the first lock-in amplifier 50 can be inexpensively configured.

SUPPLEMENTAL NOTES

The vibration component measuring device 2 in accordance with Embodiment 1 may be provided in, for example, a Kelvin probe force microscope. This allows the Kelvin probe force microscope to more quickly measure a surface shape and a surface potential distribution. Other than use in a Kelvin probe force microscope, the vibration component measuring device 2 can be used, for example, for measurement of an ionic conductivity in a functional material, measurement of charge transfer or energy dissipation in a substance, measurement of a photo-induced phenomenon, or measurement of a dopant concentration in a semiconductor or evaluation of a MOS interface.

Note that each circuit which is provided in the vibration component measuring device 2 in accordance with Embodiment 1 may be an analogue circuit or a digital circuit. Further, at least some of functions of each circuit which is provided in the vibration component measuring device 2 may be implemented by computer processing that is performed according to a program.

Embodiment 1 has discussed a case where the second AC signal has a frequency which is obtained by adding the frequency $f_m$ of the reference AC signal to a frequency that is twice the frequency $f_1$ of the first AC signal. However, the frequency of the second AC signal in Embodiment 1 is not limited to this configuration, and may have a frequency which is obtained by subtracting the frequency $f_m$ of the reference AC signal from the frequency that is twice the frequency $f_1$ of the first AC signal. In other words, the second AC signal may have a frequency that is more than one time and less than two times as high as the frequency of the first AC signal.

In this case, the second amplitude modulator 44 combines the double frequency signal from the doubler 46 with the reference AC signal from the AC power source 48, and outputs, as the second AC signal, a signal which has the frequency $2f_1-f_m$. Therefore, the signal which has the frequency $2f_1-f_m$ is also inputted, as a reference signal, to the first lock-in amplifier 50.

Since the second AC signal which is applied between the sample X and the cantilever probe 4 has the frequency $2f_1-f_m$, the signal which is outputted from the optical sensor 18 includes a component which has the frequency $f_1-f_m$. It should be noted here that in the lock-in amplifier in each of the first phase locked loop circuit 20 and the second phase locked loop circuit 22, the signal from the optical sensor 18 is compared with the first AC signal. For this reason, even in the above case, each of the first phase locked loop circuit 20 and the second phase locked loop circuit 22 still outputs a measurement signal which has the frequency $f_m$.

Further, the first amplitude modulator 42 combines the double frequency signal from the doubler 46 with the measurement signal from the high-pass filter 40, and outputs a signal which has the frequency $2f_1-f_m$. Therefore, a signal which the frequency $2f_1-f_m$ is also inputted, as a comparison signal, to the first lock-in amplifier 50.

Thus, even in a case where the first amplitude modulator 42 and the second amplitude modulator 44 each output a signal that has a frequency which is obtained by subtracting the frequency of one of the signals having been inputted from the frequency of the other one of the signals, the first lock-in amplifier 50 outputs a signal that has the synchronous demodulation component $R\cos\theta$. As a result, even in the above described case, the vibration component measuring device 2 can measure the varying component of the vibration of the cantilever probe 4, while applying, between the sample X and the cantilever probe 4, a high frequency wave whose order is at substantially the same level as the order of the vibration frequency of the cantilever probe 4.

Further, even in the above-described case, the comparison signal and the reference signal which are to be applied to the first lock-in amplifier 50 each have a sufficiently high frequency when compared to the reference AC signal. Therefore, the behavior of the sample X can be more quickly measured, in a case where a high frequency wave is applied to the sample X.

Note that the vibration component measuring device 2 in accordance with Embodiment 1 applies a voltage between the sample X and the cantilever probe 4, by grounding the cantilever probe 4 and applying a signal to the stage electrode 14 on which the sample X is mounted. However, embodiments of the present invention are not limited to such a configuration. The vibration component measuring device 2 may realize application of the voltage between the sample X and the cantilever probe 4 by application of a signal to the cantilever probe 4. The application of a signal to the cantilever probe 4 may be performed by applying, to the cantilever probe 4, a signal which is outputted by the adder 56.

<Switch>

The above has discussed the operation of the vibration component measuring device 2 in a case where the first switches S1 are closed and the second switches S2 are open as illustrated in FIG. 1. It should be noted here that in a case where the first switches S1 are open and the second switches S2 are closed, the vibration component measuring device 2 can change the voltage which is applied between the sample X and the cantilever probe 4.

Figure 7:
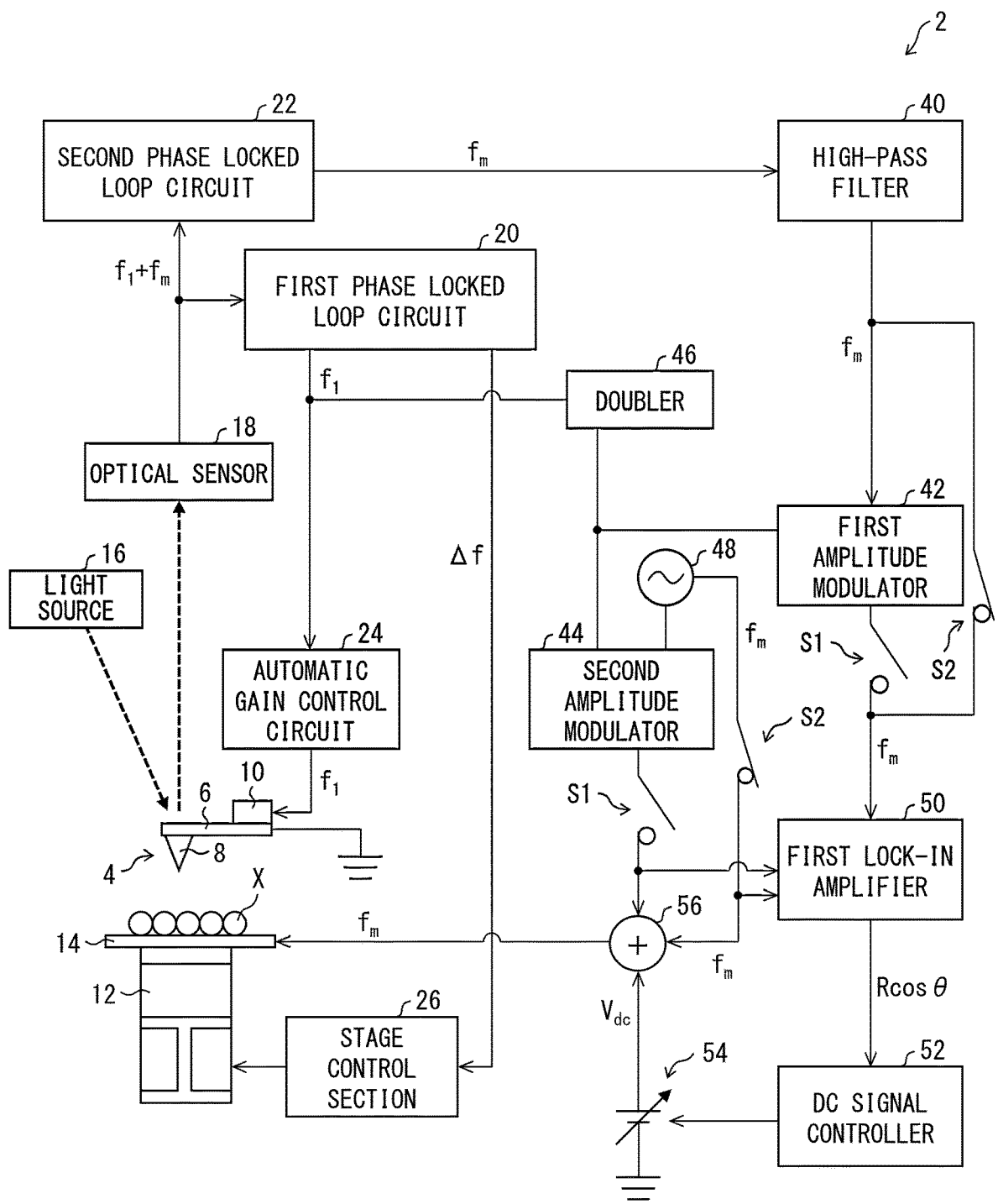
FIG. 7 is a block diagram for illustrating another example of the operation of the vibration component measuring device in accordance with Embodiment 1.

FIG. 7 is a block diagram illustrating an operation of the vibration component measuring device 2 in accordance with Embodiment 1 in a case where the first switches S1 are opened and the second switches S2 are closed.

In a case where the first switches S1 are open, neither the first amplitude modulator 42 nor the second amplitude modulator 44 outputs any signal as illustrated in FIG. 7. In addition, in a case where the second switches S2 are closed, the reference AC signal from the AC power source 48 is directly inputted to the adder 56, as illustrated in FIG. 7. Therefore, to the stage electrode 14, a signal in which the reference AC signal and the DC signal are superimposed on each other is applied. Thus, in a case where the first switches S1 are open and the second switches S2 are closed, the signal applied between sample X and the cantilever probe 4 has the frequency $f_m$.

In other words, it is possible to change the frequency of the signal which is applied between the sample X and the cantilever probe 4, by switching between the first switches S1 and the second switches S2. In this case, the signal that is outputted from the optical sensor 18 is as shown in the graph of FIG. 8.

Since the vibration frequency of the cantilever probe 4 is equivalent to an oscillation frequency of the cantilever probe 4, the vibration frequency of the cantilever probe 4 is the frequency $f_1$ regardless of whether or not switching is performed between the first switches S1 and the second switches S2. Therefore, the main component of the signal which is outputted by the optical sensor 18 is a component which has the frequency $f_1$ equivalent to the vibration frequency of the cantilever probe 4.

It should be noted here that the reference AC signal which has the frequency $f_m$ is applied between the cantilever probe 4 and the sample X. For this reason, the electrostatic interaction between the cantilever probe 4 and the sample X varies with the frequency, and the signal which is outputted by the optical sensor 18 has a component at the frequency $f_m$, as shown in FIG. 8.

Figure 8:
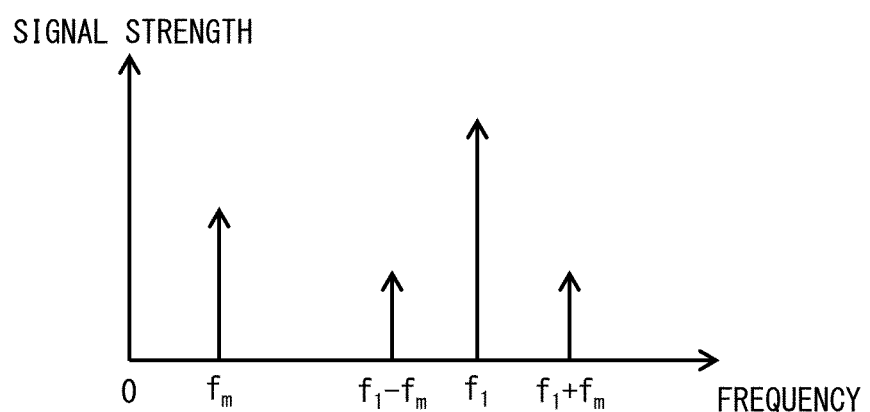
FIG. 8 is a graph showing another example of the strength of a signal which the optical sensor in accordance with Embodiment 1 receives, at each frequency of the signal.

Further, since the cantilever probe 4 vibrates at the vibration frequency $f_1$, the vibration of the cantilever probe 4 has side bands of the modulated component at the vibration frequency $f_1+f_m$ and the vibration frequency $f_1-f_m$, as shown in FIG. 8. Here, assume that the vibration frequency of the cantilever probe 4 is changed by $\Delta f$ due to the surface potential difference between the sample X and the probe part 8. In this case as well, the varying component of the vibration of the cantilever probe 4 is contained in a side band of the modulated component of the vibration of the cantilever probe 4 in the signal which is outputted by the optical sensor 18.

The signal which is outputted by the optical sensor 18 is inputted to the first phase locked loop circuit 20 and the second phase locked loop circuit 22. As a result, the first phase locked loop circuit 20 outputs the first AC signal which is to be inputted to the automatic gain control circuit 24, and the measurement signal which is to be inputted to the stage control section 26, by an operation similar to the above-described operation. Further, similarly, the second phase locked loop circuit 22 outputs the measurement signal which is to be inputted to the high-pass filter 40.

It should be noted here that the measurement signal which is outputted from the high-pass filter 40 is not inputted to the first amplitude modulator 42 but is directly inputted to the first lock-in amplifier 50, since the first switches S1 are open and the second switches S2 are closed. In other words, the comparison signal which is to be inputted to the first lock-in amplifier 50 has the frequency $f_m$.

Therefore, in order to generate, with use of the first lock-in amplifier 50, a signal which contains the synchronous demodulation component $R\cos\theta$, it is necessary to input, as the reference signal to be inputted to the first lock-in amplifier 50, a signal which has the frequency $f_m$. Accordingly, the reference AC signal from the AC power source 48 is inputted, as the reference signal, to the first lock-in amplifier 50 by opening the first switches S1 and closing the second switches S2. This makes it possible to generate the signal which contains the synchronous demodulation component $R\cos\theta$, with use of the first lock-in amplifier 50.

The signal, which is outputted from the first lock-in amplifier 50 and which contains the synchronous demodulation component $R\cos\theta$, is inputted to the DC signal controller 52. Therefore, the DC signal controller 52 controls the DC power source 54 and a DC signal is outputted from the DC power source 54, by an operation similar to the above-described operation. This makes it possible to control the DC component of the signal which is applied between the sample X and the cantilever probe 4.

The vibration component measuring device 2 in accordance with Embodiment 1 can switch the signal which is applied between the sample X and the cantilever probe 4. The signal is switched between the second AC signal which has a high frequency and the reference AC signal which has a low frequency, by switching between the first switches S1 and the second switches S2. Therefore, the vibration component measuring device 2 can measure the varying component of the vibration of the cantilever probe 4 while changing the frequency of the signal which is applied to the sample X.

Note that in a case where the reference AC signal of a low frequency is to be applied between the sample X and the cantilever probe 4, it is preferable to use, in place of the first lock-in amplifier 50, a lock-in amplifier which includes a low-pass filter that has a narrower band than that of the first lock-in amplifier 50. However, in a case where the reference AC signal which has a high frequency wave is applied between the sample X and the cantilever probe 4, it is possible to shorten the time necessary for measuring the varying component of the vibration of the cantilever probe 4 with use of the first lock-in amplifier 50 whose low-pass filter has a wide band.

Embodiment 2

<Amplitude Modulation>

Figure 9:
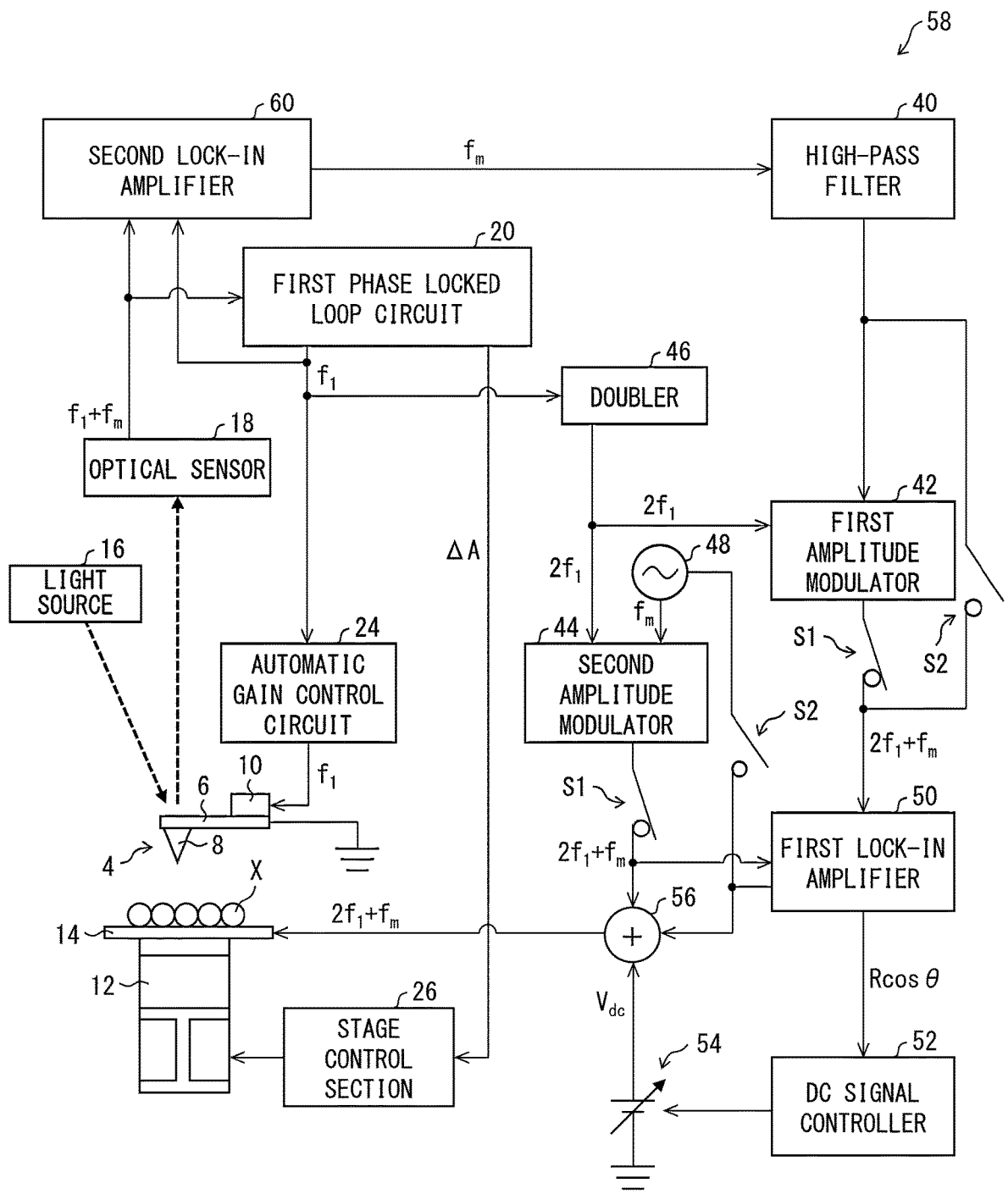
FIG. 9 is a block diagram for illustrating a configuration of a vibration component measuring device in accordance with Embodiment 2 and an operation of the vibration component measuring device.

FIG. 9 is a block diagram for illustrating a configuration of a vibration component measuring device 58 in accordance with Embodiment 2, and an operation of the vibration component measuring device 58. Note that Embodiment 2 will also discuss, as an example, an operation of the vibration component measuring device 58 in a state in which first switches S1 are closed and second switches S2 are open.

The vibration component measuring device 58 differs from the vibration component measuring device 2 only in that the vibration component measuring device 58 includes a second lock-in amplifier 60 in place of the second phase locked loop circuit 22. The second lock-in amplifier 60 may have the same configuration as the first lock-in amplifier 50, except for a band of a low-pass filter which is provided in the second lock-in amplifier 60.

Therefore, in Embodiment 2, to the second lock-in amplifier 60, a signal which has been outputted from an optical sensor 18 is inputted and a first AC signal which has been outputted from a first phase locked loop circuit 20 is inputted as a reference signal. It should be noted here that the second lock-in amplifier 60 outputs a signal which has been obtained by replacing, with a voltage, an amplitude difference between the signal from the optical sensor 18 and the first AC signal as a result of a comparison between these two signals.

In Embodiment 2, as in the foregoing embodiment, a first amplitude modulator 42 outputs a comparison signal that is obtained by adding up a frequency of a double frequency signal and a frequency of a measurement signal. Further, a second amplitude modulator 44 outputs a second AC signal, which is obtained by adding up the frequency of the double frequency signal and a frequency of a reference AC signal.

It should be noted here that respective signals which are outputted by the first amplitude modulator 42 and the second amplitude modulator 44 each have an amplitude that is obtained by adding up respective amplitudes of the two signals which have been inputted. Accordingly, in Embodiment 2, the amplitude of the comparison signal which is outputted by the first amplitude modulator 42 varies depending on a varying component of vibration of a cantilever probe 4.

Therefore, a comparison signal and the second AC signal which is the reference signal are inputted to the first lock-in amplifier 50. The comparison signal is a signal which is obtained as a result of shifting the amplitude and the phase by respective amounts of an amplitude shift R and a phase shift $\theta$ in a side band of a modulated component of the vibration of the cantilever probe 4.

As described above, the first lock-in amplifier 50 outputs a signal which contains a synchronous demodulation component Rcos θ. The synchronous demodulation component Rcos θ is a varying component of the vibration of the cantilever probe 4 which is caused by a surface potential difference between a sample X and a probe part 8. The DC signal controller 52 may control a voltage $V_{dc}$ of a signal which is outputted by a DC power source 54 so that the synchronous demodulation component Rcos θ can be 0.

In Embodiment 2, as in the foregoing embodiment, the PID controller 30 of the first phase locked loop circuit 20 outputs a signal which has a DC component. Note however that in Embodiment 2, the signal which has the DC component has a signal that corresponds to the magnitude of an amplitude shift ΔA of the vibration of the cantilever probe 4 due to an electrostatic interaction between the cantilever probe 4 and the sample X.

In Embodiment 2, as in the foregoing embodiment, among measurement signals which have been outputted from the first phase locked loop circuit 20, the signal which has the DC component is inputted to a stage control section 26. The stage control section 26 can give feedback so that among frequencies of the measurement signals, the value of the amplitude shift ΔA equivalent to the amplitude shift of the cantilever probe 4 becomes constant. In a case where the distance between the sample X and the probe part 8 is constant while the cantilever probe 4 is not vibrating, the value of the frequency shift Δf is constant. Therefore, the probe part 8 performs scanning on the sample X and a position on a stage 12 is sequentially recorded while the amplitude shift ΔA is kept constant, so that the vibration component measuring device 2 can measure a surface shape of the sample X.

The vibration component measuring device 58 in accordance with Embodiment 2 can measure the varying component of the vibration of the cantilever probe 4 as the amplitude shift of the vibration of the cantilever probe 4. In Embodiment 2, as in the foregoing embodiment, the vibration component measuring device 58 can more quickly measure the amplitude shift of the vibration of the cantilever probe 4 in a case where a high-frequency signal is applied between the sample X and the cantilever probe 4.

Note that in Embodiment 2, the vibration component measuring device 58 may output the signal which is to be inputted to the stage control section 26, by using a lock-in amplifier which is provided with a filter whose band is narrower than that of the second lock-in amplifier 60, in place of the first phase locked loop circuit 20. Furthermore, in a case where the band of the filter that is contained in the stage control section 26 is narrow, the vibration component measuring device 58 may generate, by a single lock-in amplifier, the signal which is to be inputted to the stage control section 26 and the measurement signal which is to be inputted to the first amplitude modulator 42. In these cases, the vibration component measuring device 58 may include an AC power source for generating the first AC signal, and the first AC signal which has been outputted from the AC power source may be inputted to the probe control section 10 and to each lock-in amplifier.

Embodiment 3

<Another Example of Generation of Comparison Signal>

Figure 10:
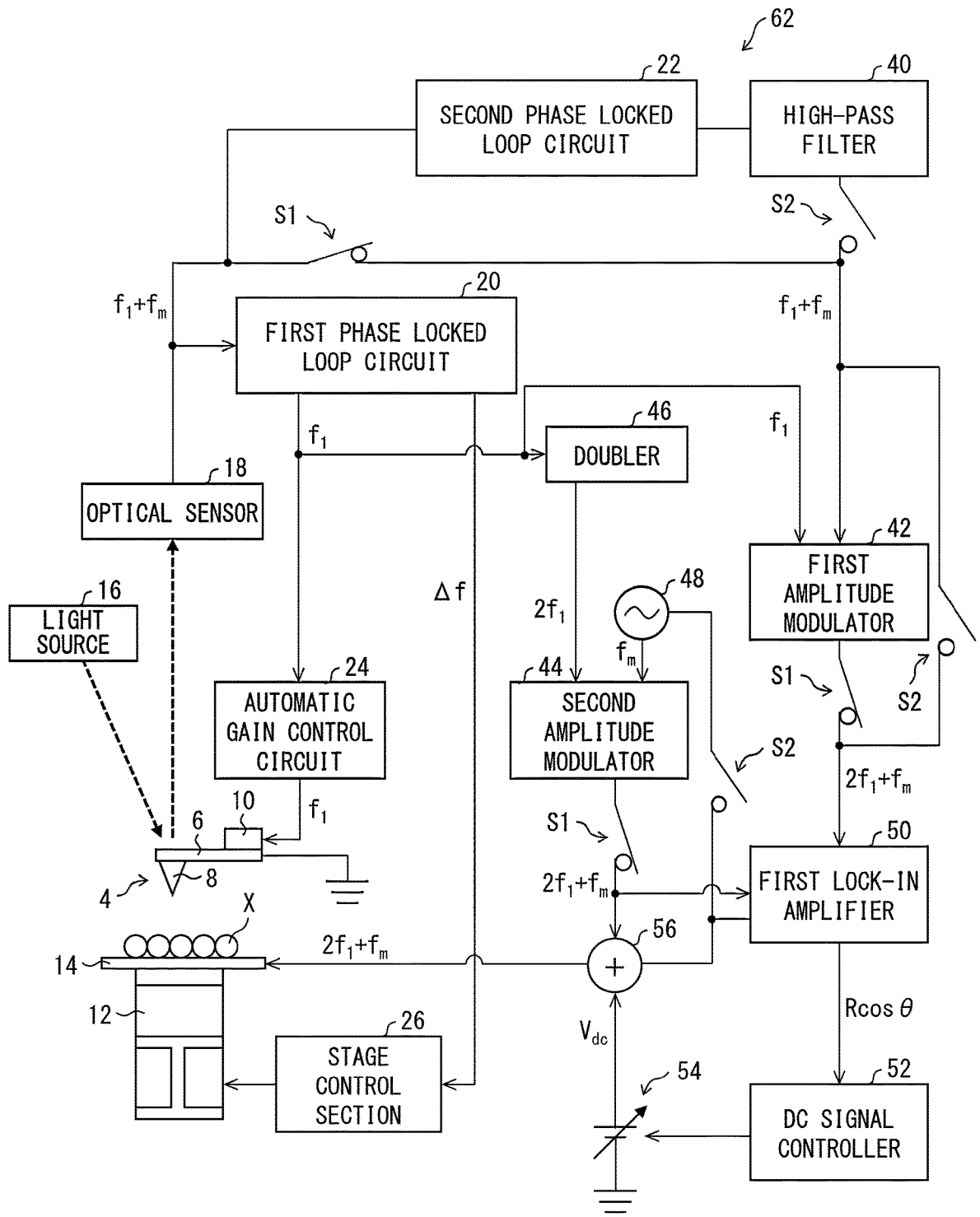
FIG. 10 is a block diagram for illustrating a configuration of a vibration component measuring device in accordance with Embodiment 3 and an operation of the vibration component measuring device.

FIG. 10 is a block diagram for illustrating a configuration of a vibration component measuring device 62 in accordance with Embodiment 3, and an operation of the vibration component measuring device 62. Note that in Embodiment 3, as in the foregoing embodiments, the following description will discuss, as an example, an operation of the vibration component measuring device 62 in a state in which first switches S1 are closed and second switches S2 are open.

Unlike in the vibration component measuring device 2, in the vibration component measuring device 62 in accordance with Embodiment 3, a signal from an optical sensor 18 is directly inputted to a first amplitude modulator 42 in a case where the first switches S1 are closed. Furthermore, to the first amplitude modulator 42, a first AC signal which has been outputted from the first phase locked loop circuit 20 is inputted without passing through a doubler 46. Except for the above points, the vibration component measuring device 62 in accordance with Embodiment 3 has the same configuration as the vibration component measuring device 2 and performs the same operation as the vibration component measuring device 2.

The signal which is outputted from the optical sensor 18 includes a component which has a frequency $f_1+f_m$. Therefore, in Embodiment 3, as in the foregoing embodiments, a comparison signal which is inputted from the first amplitude modulator 42 to a first lock-in amplifier 50 includes a component which has a frequency $2f_1+f_m$. A reference signal which is inputted to the first lock-in amplifier 50 is a second AC signal which has the frequency $2f_1+f_m$ from a second amplitude modulator 44 as in the foregoing embodiments. Therefore, it is possible to generate a signal which contains a synchronous demodulation component Rcos θ with use of the first lock-in amplifier 50.

Note that since the signal from the optical sensor 18 includes a component which has a frequency other than the frequency $f_1+f_m$, the comparison signal which is inputted from the first amplitude modulator 42 to the first lock-in amplifier 50 includes a component which has a frequency other than the frequency $2f_1+f_m$. However, the first lock-in amplifier 50 has a low-pass filter, and the low-pass filter removes, from the signal which is to be outputted from the first lock-in amplifier 50, a component at a frequency excluding the frequency of the signal which contains the synchronous demodulation component Rcos θ.

Note that in a state in which the first switches S1 are open and the second switches S2 are closed, the signal which has been outputted from the optical sensor 18 is inputted to a second phase locked loop circuit 22. Further, in the above-described state, a measurement signal which has been outputted from the second phase locked loop circuit 22 is inputted to the first lock-in amplifier 50 via a high-pass filter 40. In other words, in a state in which the first switches S1 are open and the second switches S2 are closed, the vibration component measuring device 62 in accordance with Embodiment 3 carries out the same operation as the vibration component measuring device 2.

In Embodiment 3, as in the foregoing embodiments, the vibration component measuring device 62 can measure a variation of an interaction between a sample X and a cantilever probe 4 in a case where a high frequency wave is applied to the sample X. In other words, the vibration component measuring device 62 can measure behavior of the sample X in a case where the high frequency wave is applied to the sample X.

Further, in a case where the high frequency wave is applied to the sample X, the signal which has been outputted from the optical sensor 18 is inputted to the first amplitude modulator 42 without passing through the second phase locked loop circuit 22 in Embodiment 3. Therefore, the behavior of the sample X can be more quickly measured, in a case where the high frequency wave is applied to the sample X.

Furthermore, in a case where only a high frequency reference AC signal is to be applied between the sample X and the cantilever probe 4, the second phase locked loop circuit 22 and the high-pass filter 40 are not necessarily required in addition to the first switches S1 and the second switches S2. This makes it possible to configure the vibration component measuring device 62 in a simpler manner.

Embodiment 4

<Another Example of Generation of Comparison Signal and Reference Signal>

Figure 11:
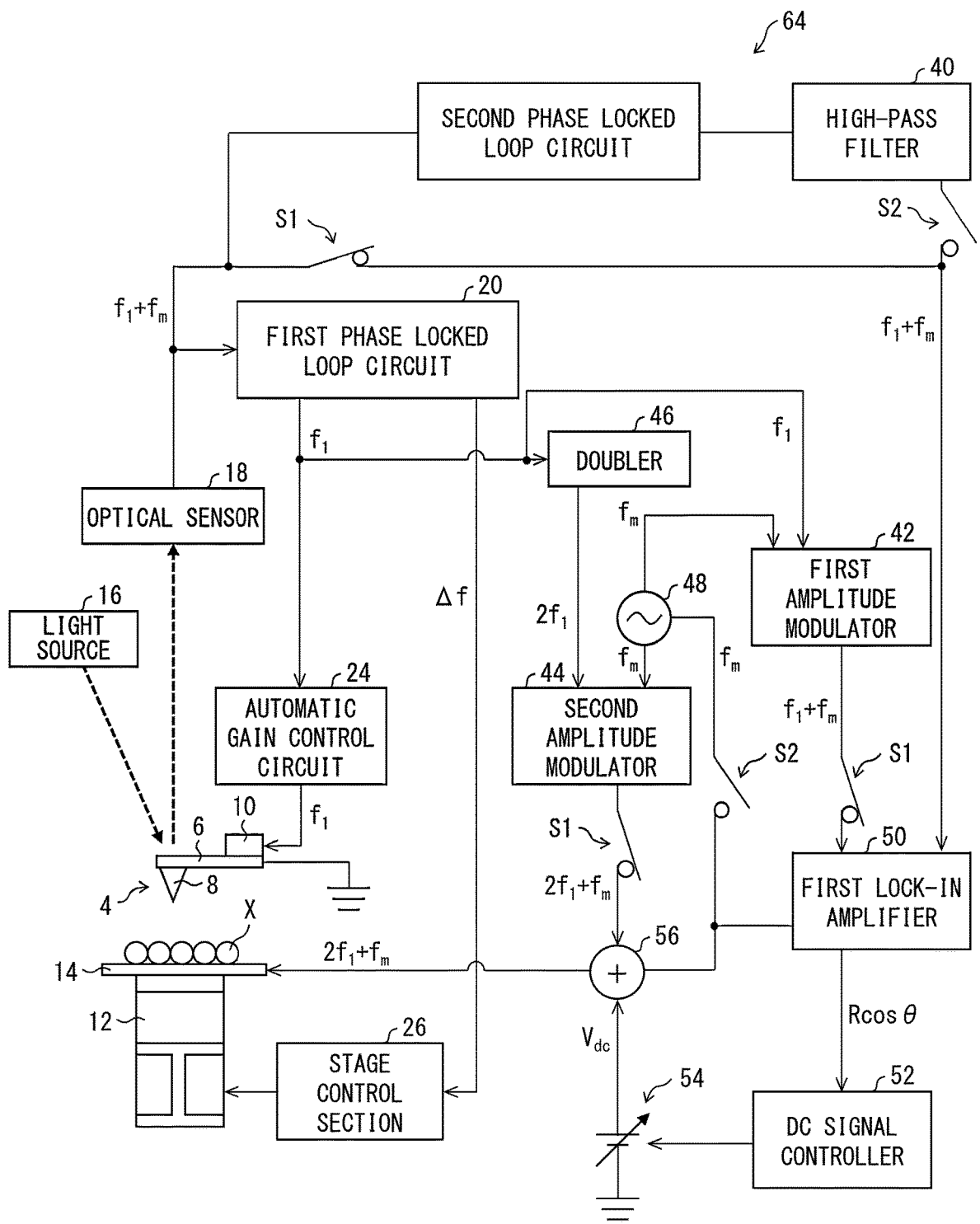
FIG. 11 is a block diagram for illustrating a configuration of a vibration component measuring device in accordance with Embodiment 4 and an operation of the vibration component measuring device.

FIG. 11 is a block diagram for illustrating a configuration of a vibration component measuring device 64 in accordance with Embodiment 4, and an operation of the vibration component measuring device 64. Note that in Embodiment 4, as in the foregoing embodiments, the following will discuss, as an example, an operation of the vibration component measuring device 64 in a state in which first switches S1 are closed and second switches S2 are open.

Unlike in the vibration component measuring device 62, in the vibration component measuring device 64 in accordance with Embodiment 4, in a case where first switches S1 are closed, a measurement signal which has been outputted from an optical sensor 18 is directly inputted, as a comparison signal, to a first lock-in amplifier 50. Therefore, the signal which is inputted to the first lock-in amplifier 50 has a component at a frequency $f_1+f_m$.

Furthermore, first AC signal which has been outputted from a first phase locked loop circuit 20 and a reference AC signal from an AC power source 48 are inputted to a first amplitude modulator 42. Therefore, the signal which is outputted from the first amplitude modulator 42 has a component at the frequency $f_1+f_m$. In addition, the signal which has been outputted from the first amplitude modulator 42 is inputted, as a reference signal, to the first lock-in amplifier 50.

Except for the above points, the vibration component measuring device 64 in accordance with Embodiment 4 has the same configuration as the vibration component measuring device 62 and performs the same operation as the vibration component measuring device 62.

In Embodiment 4, the first lock-in amplifier 50 compares the comparison signal that has the component at the frequency $f_1+f_m$ with the reference signal which has the component at the frequency $f_1+f_m$. Therefore, it is possible to generate a signal which contains a synchronous demodulation component $R\cos\theta$ with use of the first lock-in amplifier 50.

Note that since a signal from the optical sensor 18 includes a component which has a frequency other than the frequency $f_1+f_m$, the comparison signal which is inputted from the first amplitude modulator 42 to the first lock-in amplifier 50 includes a component which has a frequency other than the frequency $f_1+f_m$. However, the first lock-in amplifier 50 has a low-pass filter, and the low-pass filter removes, from the signal which is to be outputted from the first lock-in amplifier 50, a component at a frequency excluding the frequency of the signal which contains the synchronous demodulation component $R\cos\theta$.

Note that in a state in which the first switches S1 are open and the second switches S2 are closed, the signal which has been outputted from the optical sensor 18 is inputted to a second phase locked loop circuit 22. Further, in the above-described state, the measurement signal which has been outputted from the second phase locked loop circuit 22 is inputted to the first lock-in amplifier 50 via a high-pass filter 40. Further, the reference AC signal from the AC power source 48 is directly inputted, as a reference signal, to the first lock-in amplifier 50. In other words, in the state in which the first switches S1 are open and the second switches S2 are closed, the vibration component measuring device 64 in accordance with Embodiment 4 carries out the same operation as the vibration component measuring device 62.

In Embodiment 4, as in the foregoing embodiments, the vibration component measuring device 64 can measure a variation of an interaction between a sample X and a cantilever probe 4 in a case where a high frequency wave is applied to the sample X. In other words, the vibration component measuring device 64 can measure behavior of the sample X in a case where the high frequency wave is applied to the sample X. Further, the comparison signal and the reference signal which are to be applied to the first lock-in amplifier 50 also have a sufficiently high frequency when compared to the reference AC signal. Therefore, in Embodiment 4, as in the foregoing embodiments, the behavior of the sample X can be more quickly measured, in a case where the high frequency wave is applied to the sample X.

Further, in a case where the high frequency wave is applied to the sample X, the signal which has been outputted from the optical sensor 18 is inputted to the first lock-in amplifier 50 without passing through the second phase locked loop circuit 22 and the first amplitude modulator 42 in Embodiment 4. Therefore, the behavior of the sample X can be more quickly measured, in a case where the high frequency wave is applied to the sample X.

Embodiment 5

<Another Example of Amplitude Modulation>

Figure 12:
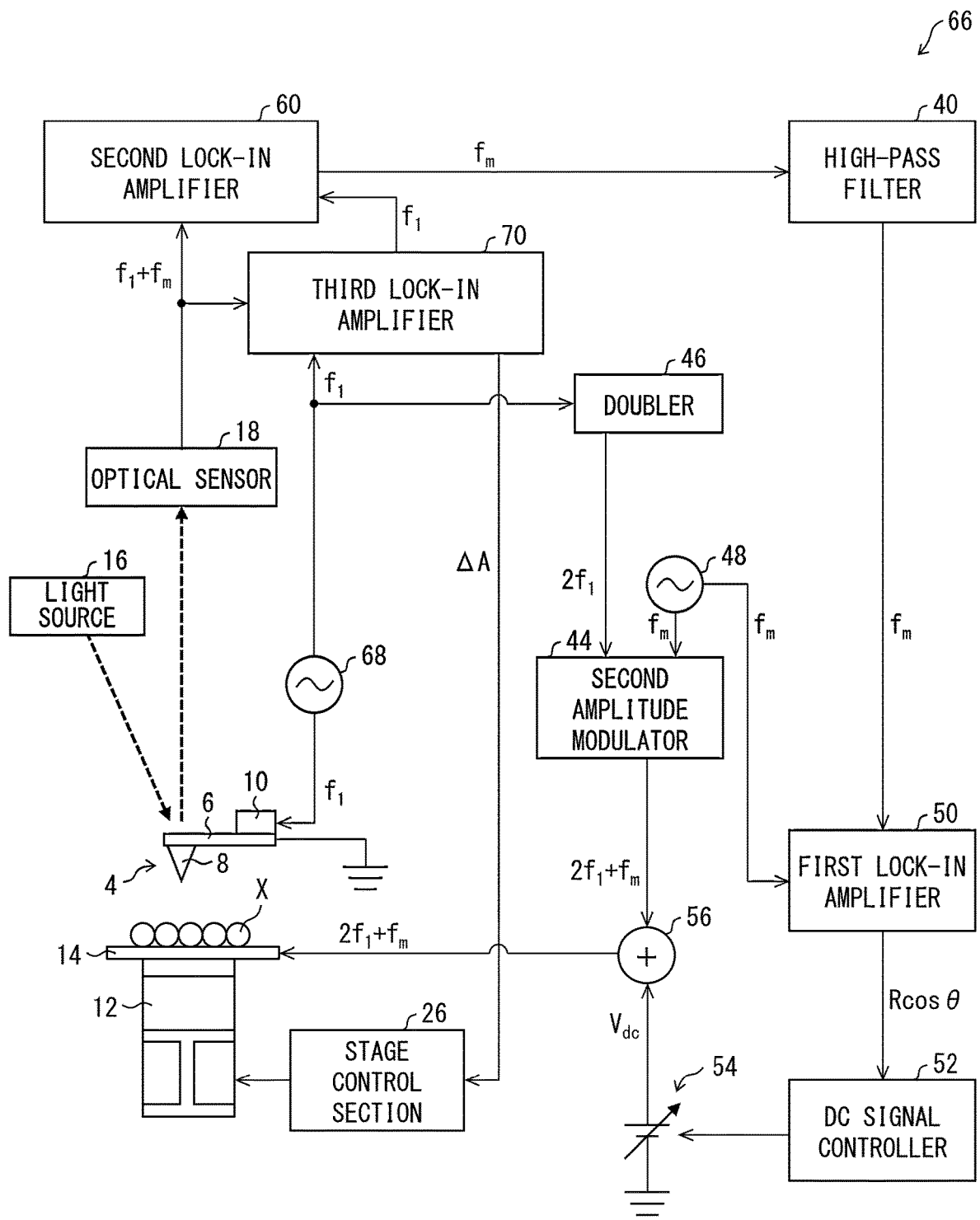
FIG. 12 is a block diagram for illustrating a configuration of a vibration component measuring device in accordance with Embodiment 5 and an operation of the vibration component measuring device.

FIG. 12 is a block diagram for illustrating a configuration of a vibration component measuring device 66 in accordance with Embodiment 5, and an operation of the vibration component measuring device 66. The vibration component measuring device 66 in accordance with Embodiment 5 differs in configuration from the vibration component measuring device 58 in that the vibration component measuring device 66 includes an additional AC power source 68 in place of the automatic gain control circuit 24. The additional AC power source 68 generates a first AC signal which has a frequency $f_1$. The first AC signal which has been generated by the additional AC power source 68 is applied to a probe control section 10.

Further, the vibration component measuring device 66 differs from the vibration component measuring device 58 in that the vibration component measuring device 66 includes a third lock-in amplifier 70 in place of the first phase locked loop circuit 20. The third lock-in amplifier 70 has the same configuration as the first lock-in amplifier 50 or the second lock-in amplifier 60 except for a band of a low-pass filter provided. For example, the third lock-in amplifier 70 includes a low-pass filter which has the same band as the low-pass filter of the narrowband lock-in amplifier 28.

The third lock-in amplifier 70 compares a signal from an optical sensor 18 with a first AC signal which has been generated by the additional AC power source 68. The third lock-in amplifier 70 thus outputs a signal which has been obtained by replacing, with a voltage, an amplitude difference of those signals which have been inputted. The signal thus outputted has a strength which corresponds to the magnitude of an amplitude shift ΔA of vibration of a cantilever probe 4 due to an electrostatic interaction between the cantilever probe 4 and a sample X. Accordingly, it is possible to give feedback so as to make the value of the amplitude shift ΔA constant by inputting, to a stage control section 26, the signal which has been outputted from the third lock-in amplifier 70.

In addition, unlike the vibration component measuring device 58, the vibration component measuring device 66 does not include the first amplitude modulator 42, the first switches S1, and the second switches S2. Accordingly, respective signals serving as a comparison signal and a reference signal are inputted to the first lock-in amplifier 50. The signal serving as the comparison signal is a signal that has a component which has a frequency $f_m$ and that has been outputted from the second lock-in amplifier 60 via a high-pass filter 40, and the signal serving as the reference signal is AC signal from an AC power source 48. Further, a signal which is outputted by a second amplitude modulator 44 is directly applied to the adder 56 without passing through a switch. The vibration component measuring device 66 therefore compares, in the first lock-in amplifier 50, those two signals each of which has a component at the frequency $f_m$, and applies, to a stage electrode 14, a signal which has a component at a frequency $2f_1+f_m$.

Except for the above, the vibration component measuring device 66 in accordance with Embodiment 5 has the same configuration as the vibration component measuring device 58 and carries out the same operation as the vibration component measuring device 58. Therefore, in Embodiment 5, as in the foregoing embodiments, the vibration component measuring device 66 can more quickly measure the amplitude shift of the vibration of the cantilever probe 4 in a case where a high-frequency signal is applied between the sample X and the cantilever probe 4.

Embodiment 6

<Surface Charge Measuring Device>

Figure 13:
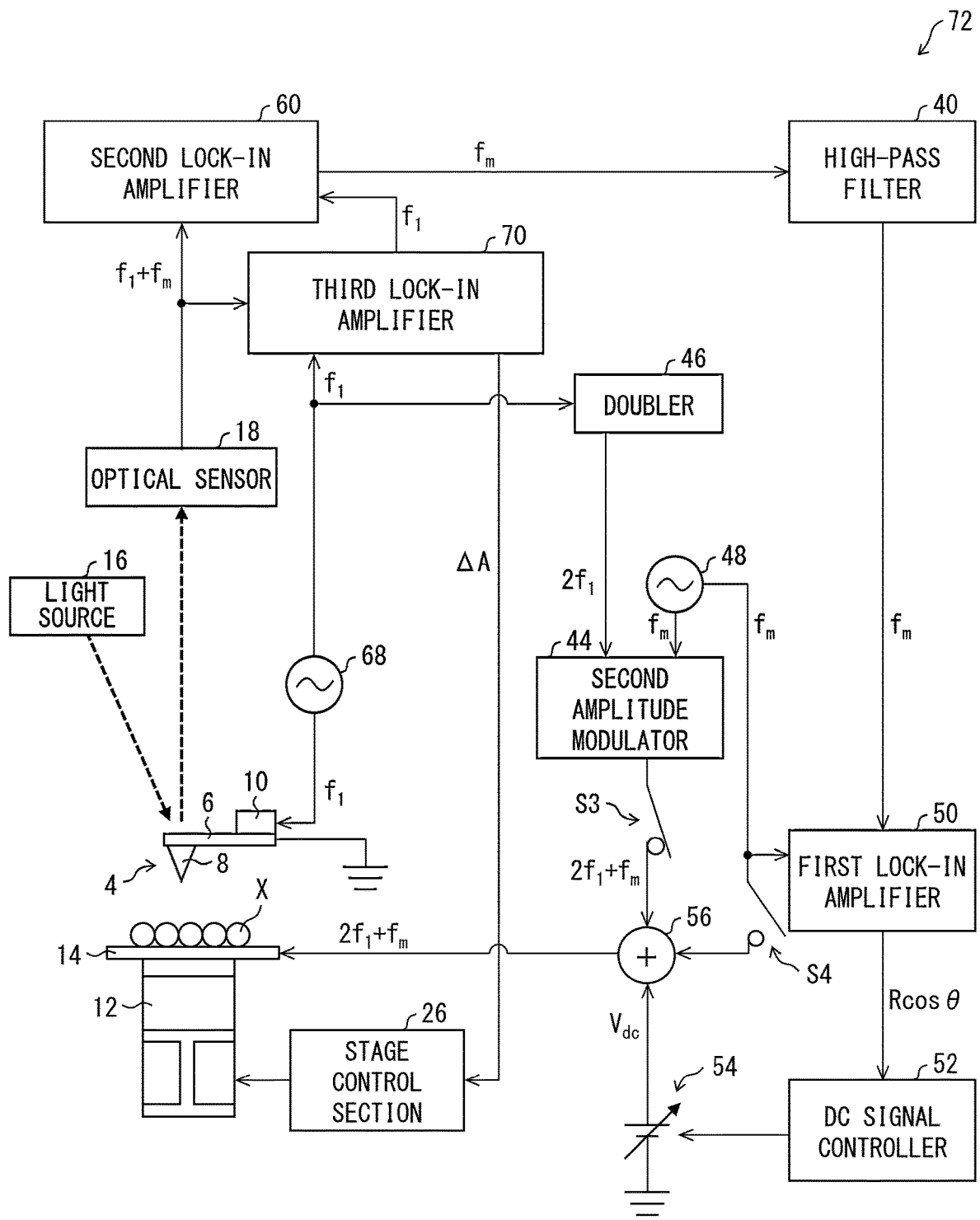
FIG. 13 is a block diagram for illustrating a configuration of a vibration component measuring device in accordance with Embodiment 6 and an operation of the vibration component measuring device.

FIG. 13 is a block diagram for illustrating a configuration of a vibration component measuring device 72 in accordance with Embodiment 6, and an operation of the vibration component measuring device 72. The vibration component measuring device 72 in accordance with Embodiment 6 differs in configuration from the vibration component measuring device 66 in that the vibration component measuring device 72 further includes a third switch S3 and a fourth switch S4.

In Embodiment 6, in a case where the third switch S3 is closed and the fourth switch S4 is open, a signal which is outputted by a second amplitude modulator 44 is inputted to an adder 56 and a signal from an AC power source 48 is inputted to only a first lock-in amplifier 50, as illustrated in FIG. 13. On the other hand, in Embodiment 6, in a case where the third switch S3 is open and the fourth switch S4 is closed, the signal from the AC power source 48, instead of the signal from the second amplitude modulator 44, is inputted to the adder 56.

Thus, in a case where the third switch S3 is closed and the fourth switch S4 is open, the vibration component measuring device 72 applies, between a sample X and a cantilever probe 4, a relatively high-frequency signal that has a component at a frequency $2f_1+f_m$. On the other hand, in a case where the third switch S3 is open and the fourth switch S4 is closed, the vibration component measuring device 72 applies, between the sample X and the cantilever probe 4, a relatively low-frequency signal that has a component at a frequency $f_m$. Therefore, the vibration component measuring device 72 can switch, by switching between the third switch S3 and the fourth switch S4, the frequency of the signal which is applied between the sample X and the cantilever probe 4 between frequencies of a high frequency wave and a low frequency wave.

Except for the above, the vibration component measuring device 72 in accordance with Embodiment 6 has the same configuration as the vibration component measuring device 66 and carries out the same operation as the vibration component measuring device 66. Therefore, in Embodiment 6, as in the foregoing embodiments, the vibration component measuring device 72 can more quickly measure an amplitude shift of vibration of the cantilever probe 4 in a case where a high-frequency signal is applied between the sample X and the cantilever probe 4.

<Band Bending>

The vibration component measuring device 72 in accordance with Embodiment 6 can measure behavior of a valence band and behavior of a conduction band in the vicinity of a surface of the sample X. This allows the vibration component measuring device 72 to measure a local charge which is on the surface of the sample X and which includes an electron defect or a local charge on the surface of the sample X. In order to explain how to measure the local charge on the surface of the sample X by the vibration component measuring device 72, the following description will discuss bending of the valence band and the conduction band in the vicinity of the sample X due to the surface charge of the sample X.

FIG. 14 shows band diagrams for illustrating how the valence band and the conduction band in the vicinity of the surface of the sample X bend due to the surface charge of the sample X. Each of the band diagrams shown in FIG. 14 shows a state in a bulk 74 of the sample X that is an n-type semiconductor and a state on a surface 76 of the bulk 74. The band diagrams B1 and B2 show an example of the behavior in each state in a case where an electron defect occurs on the surface 76 of the sample X. The band diagrams B3 and B4 show an example of the behavior in each state in a case where a local charge occurs on the surface 76 of the sample X.

In a case where an electron defect occurs on the surface 76 of the sample X, the surface 76 has a Fermi level $E_{FS}$, which is lower than the Fermi level $E_{FB}$ of the bulk 74, as shown in the band diagram B1. In this state, transfer of electrons occurs from the bulk 74 to the electron defect at the surface 76 so as to equalize the Fermi level $E_{FB}$ of the bulk 74 and the Fermi level $E_{FS}$ of the surface 76. Thus, as shown in the band diagram B2, the level difference between the Fermi level $E_{FB}$ of the bulk 74 and the Fermi level $E_{FS}$ of the surface 76 is reduced. Then, the bulk 74 in the vicinity of the electron defect is locally positively charged, and the surface 76 in the vicinity of the electron defect is locally negatively charged.

Therefore, between the bulk 74 and the surface 76 in the vicinity of the electron defect, an electric field occurs due to the local charge. It should be noted here that since the bulk 74 is positively charged and the surface 76 is negatively charged, both of a valence band level $E_V$ and a conduction band level $E_C$ are bent upward in the band diagram in the bulk 74 in the vicinity of the surface 76, as shown in the band diagram B2.

In contrast, in a case where local electrons are present on the surface 76 of the sample X, the Fermi level $E_{FS}$ of the surface 76 is higher than the Fermi level $E_{FB}$ of the bulk 74, as shown in the band diagram B3. In this state, some of the local electrons on the surface 76 transfer to the bulk 74 so as to equalize the Fermi level $E_{FB}$ of the bulk 74 and the Fermi level $E_{FS}$ of the surface 76. Thus, as shown in the band diagram B4, the level difference between the Fermi level $E_{FB}$ of the bulk 74 and the Fermi level $E_{FS}$ of the surface 76 is reduced. Then, in the vicinity of a position where the transfer of electrons has occurred, the bulk 74 is locally negatively charged and the surface 76 is locally positively charged.

Therefore, in the vicinity of the position, an electric field is produced, by the local charge, between the bulk 74 and the surface 76. It should be noted here that since the bulk 74 is negatively charged and the surface 76 is positively charged, both of the valence band level $E_V$ and the conduction band level $E_C$ are bent downward in the band diagram in the bulk 74 in the vicinity of the surface 76, as shown in the band diagram B4.

<Behavior of Band Bending in State in which External Electric Field is Given>

Next, the following description will discuss the behavior of the valence band and the behavior of the conduction band in the vicinity of the surface of the sample X, in a case were an external electric field occurs in the vicinity of the surface of the sample X in a state in which the valence band and the conduction band in the vicinity of the surface of the sample X is bent. FIG. 15 shows band diagrams that further illustrate, in addition to the state in the bulk 74 of the sample X that is the n-type semiconductor and the state at the surface 76 of the bulk 74, a state of an external electrode 78 which is brought close to the surface 76. Note that each of the band diagrams shown in FIG. 15 shows an equilibrium state in which the transfer of electrons between the bulk 74 and the electron defect at the surface 76 has occurred sufficiently.

In a case where the potential of the external electrode 78 is negative, the Fermi level $E_{EF}$ of the external electrode 78 shifts upward in the band diagram as shown in the band diagram B5 of FIG. 15, as compared with a case where the potential of the external electrode 78 is 0. As a result, an external electric field occurs between the external electrode 78 and the surface 76 of the sample X, and the Fermi level $E_{FS}$ of the surface 76 in a steady state is further shifted downward in the band diagram. In this case, since the transfer of electrons from the bulk 74 to the electron defect at the surface 76 further progresses, the valence band level $E_V$ and the conduction band level $E_C$ of the bulk 74 are further bent upward in the band diagram as shown in the band diagram B5.

On the other hand, in a case where the potential of the external electrode 78 is positive, the Fermi level $E_{EF}$ of the external electrode 78 shifts downward in the band diagram as shown in the band diagram B6 of FIG. 15, as compared with the case where the potential of the external electrode 78 is 0. As a result, an external electric field occurs between the external electrode 78 and the surface 76 of the sample X, and the Fermi level $E_{FS}$ of the surface 76 in the steady state is further shifted upward in the band diagram. In this case, since the transfer of electrons from the bulk 74 to the electron defect at the surface 76 is reduced, the valence band level $E_V$ and the conduction band level $E_C$ of the bulk 74 less bend.

Further, as a result of increasing the potential of the external electrode 78, the Fermi level $E_{FS}$ of the surface 76 in the steady state becomes higher than the Fermi level $E_F$ of the bulk 74, and the transfer of electrons from the electron defect of the surface 76 to the bulk 74 may occur, as shown in the band diagram B6. In this case, as shown in the band diagram B6, the valence band level $E_V$ and the conduction band level $E_C$ of the bulk 74 are bent downward in the band diagram.

Thus, in a case where band bending occurs in the bulk 74 of the sample X, the degree of the bending of the bands of the bulk 74 or the direction of the bending is varied by varying the external electric field that occurs in the vicinity of the surface 76.

It should be noted here that in a case where the external electrode 78 is replaced with the cantilever probe 4 in accordance with Embodiment 6, application of a potential to the external electrode 78 corresponds to application of a potential to a stage electrode 14 in accordance with Embodiment 6. In a case where the bending of the band occurs in the vicinity of the surface 76 of the bulk 74, a change occurs in a vibration component of the cantilever probe 4.

<Reaction Rate of Charge Transfer>

Next, the following description will discuss a reaction rate of charge transfer between the bulk 74 and the surface 76. The reaction rate of capture of electrons from the bulk 74 in surface states of the surface 76 is expressed by the following formula (1), and the reaction rate of electron emission to the bulk 74 in the surface states of the surface 76 is expressed by the following (2).

$$\frac{dn_s}{dt} = C_n n(1 - n_s) \quad (1)$$

$$\frac{dn_s}{dt} = -e_n n_s \quad (2)$$

In the above formulae (1) and (2), $n_s$ indicates an electronic occupancy of the surface states. In formula (1), $C_n$ is an electronic capture coefficient, and in formula (2), $e_n$ is an electron emission coefficient. It should be noted here that when attention is focused on the electron emission from the surface 76 to the bulk 74, the time constant T corresponding to the time of the transfer of electrons from the surface 76 to the bulk 74 is defined by the following formula (3).

$$\tau = \frac{1}{e_n} = \tau_0 \exp\left\{\frac{\Delta E}{\eta k_B T}\right\} \quad (3)$$

In formula (3), $\tau_0$ is a lifetime in the steady state, $k_B$ is the Boltzman constant, and T is a temperature of the sample X. In formula (3), $\eta$ is a correction term, and typically takes a value from 1 to 2. $\Delta E$ in formula (3) is a difference between the Fermi level $E_{FS}$ of the surface 76 and the Fermi level $E_F$ of the bulk 74 prior to electron emission from the surface 76 into the bulk 74. With the above formula (3), the above formula (2) can be transformed into the following formula (4).

$$\frac{dn_s}{dt} = -\frac{n_s}{\tau} \quad (4)$$

According to formula (4), the time required for electron emission from the surface 76 to the bulk 74 is proportional to the time constant $\tau$. When the time constant $\tau$ is increased, the time required for the electron emission from the surface 76 to the bulk 74 becomes longer. In other words, as the time constant $\tau$ increases, the time required to cause the bending of the bands of the bulk 74 becomes longer due to the electron emission from the surface 76 to the bulk 74.

Therefore, in a case where the external electric field that occurs in the vicinity of the surface 76 changes and consequently the Fermi level $E_{FS}$ of the surface 76 changes, the bending of the bands of the bulk 74 may not follow the change of the Fermi level $E_{FS}$ of the surface 76 in a case where a variation of the Fermi level $E_{FS}$ occurs faster than a certain rate.

<Cutoff Frequency>

Assume here that, for example, an AC signal is applied to the external electrode 78, and the external electric field that is generated between the external electrode 78 and the surface 76 is periodically varied. In this case, while the AC signal has a low frequency, the bending of the bands of the bulk 74 follows the variation of the Fermi level $E_{FS}$ of the surface 76. However, when the AC signal has a frequency higher than a certain value, the bending of the bands of the bulk 74 no longer follows the variation of the Fermi level $E_{FS}$ of the surface 76. On the premise that the frequency at which the bending of the bands of the bulk 74 no longer follows the variation of the Fermi level $E_{FS}$ of the surface 76 is defined as a cutoff frequency $f_c$, the cutoff frequency $f_c$ is expressed by the following formula (5).

$$f_c = \frac{1}{2\pi\tau} \quad (5)$$

According to the formulae (3) and (5), when there is a greater difference $\Delta E$ between the Fermi level $E_{FS}$ of the surface 76 and the Fermi level $E_F$ of the bulk 74, the cutoff frequency fc is lower. Meanwhile, when the sample X has a higher temperature, the cutoff frequency $f_c$ is lower.

Figure 16:
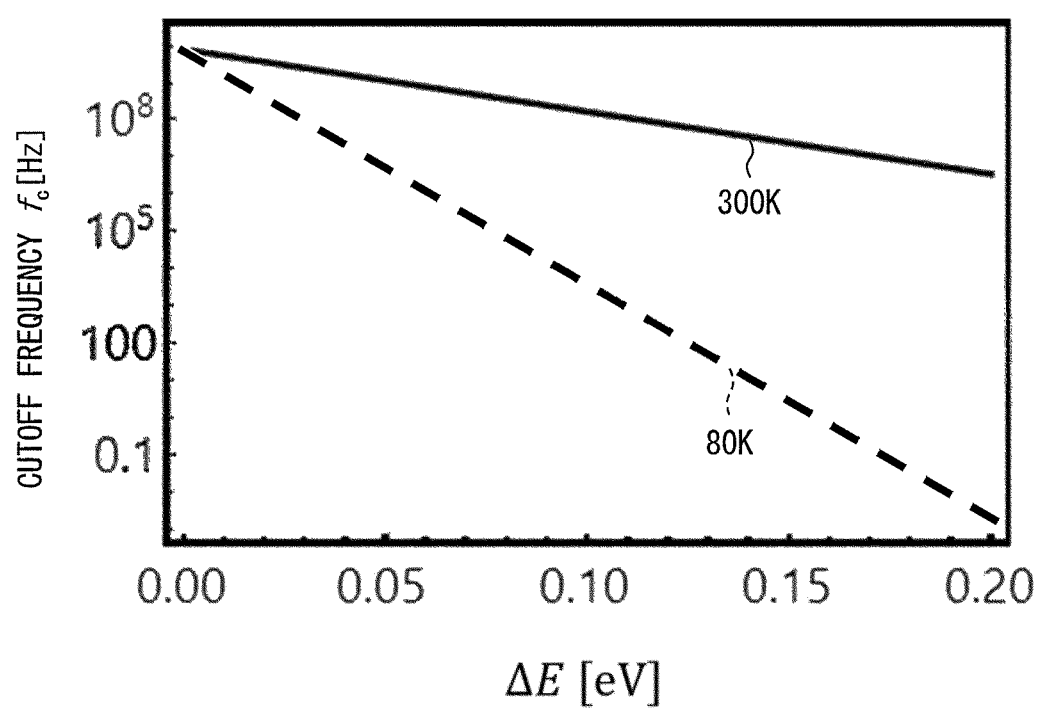
FIG. 16 is a graph that shows a cutoff frequency for each difference between a Fermi level of the bulk of the sample and a Fermi level of the surface of the sample, the cutoff frequency being a frequency of a signal applied to an external electrode and at which variation of the band bending in the bulk of the sample no longer occurs.

The following will discuss in more detail a relation between the cutoff frequency fc and $\Delta E$ with reference to a graph shown in FIG. 16. In the graph shown in FIG. 16, the vertical axis represents the cutoff frequency $f_c$ [Hz], and the horizontal axis represents $\Delta E$ [eV]. In the graph shown in FIG. 16, a case where the temperature of the sample X is 300K is shown by a solid line, and a case where the temperature of the sample X is 80K is shown by a dotted line.

For example, when the temperature of the sample X is 80K and $\Delta E$ is 0.1 eV, the cut-off frequency $f_c$ is 166 kHz. Therefore, in the above case, when a signal at a frequency of not less than 166 kHz is applied to the external electrode 78 and the external electric field is varied, the bending of the bands generated in the bulk 74 of the sample X does not follow such a variation of the external electric field and does not vary to a large extent.

<Measurement and Imaging of Band Bending>

In the vibration component measuring device 72 in accordance with Embodiment 6, the potential difference between the cantilever probe 4 and the sample X is varied periodically by applying an AC signal to the stage electrode 14. Accordingly, in a case where the AC signal applied to the stage electrode 14 has a frequency less than the cutoff frequency $f_c$, the bending of the bands of the bulk 74 also varies in accordance with a variation in the potential difference between the cantilever probe 4 and the sample X. This allows the vibration component measuring device 72 to measure the bending of the bands of the bulk 74 as a variation of the vibration component of the cantilever probe 4. On the other hand, in a case where the frequency of the AC signal applied to the stage electrode 14 is not less than the cut-off frequency $f_c$, the bending of the bands of the bulk 74 no longer follows the variation of the potential difference between the cantilever probe 4 and the sample X. As a result, the variation of the vibration component of the cantilever probe 4 can no longer be observed.

Therefore, while the frequency of the AC signal to be applied to the stage electrode 14 is switched, measurement is performed. This makes it possible to measure the vibration component of the cantilever probe 4, while switching is performed between a varying state and a non-varying state of the bending of the bands of the bulk 74. Therefore, it is possible measure a state (e.g., electron defect or local electrons) of the surface of the sample X, by determining a difference between measurement results of the vibration component of the cantilever probe 4 with and without the variation of the bending of the bands of bulk 74.

The vibration component measuring device 72 in accordance with Embodiment 6 can switch the frequency of the AC signal to be applied to the stage electrode 14 between the frequency $f_m$ and the frequency $2f_1+f_m$ in accordance with switching between the third switch S3 and the fourth switch S4. The vibration component measuring device 72 can thus more easily measure the state of the surface of the sample X, by setting the frequency $f_m$ to less than the cutoff frequency $f_c$ and the frequency $2f_1+f_m$ to not less than the cutoff frequency $f_c$.

Figure 17:
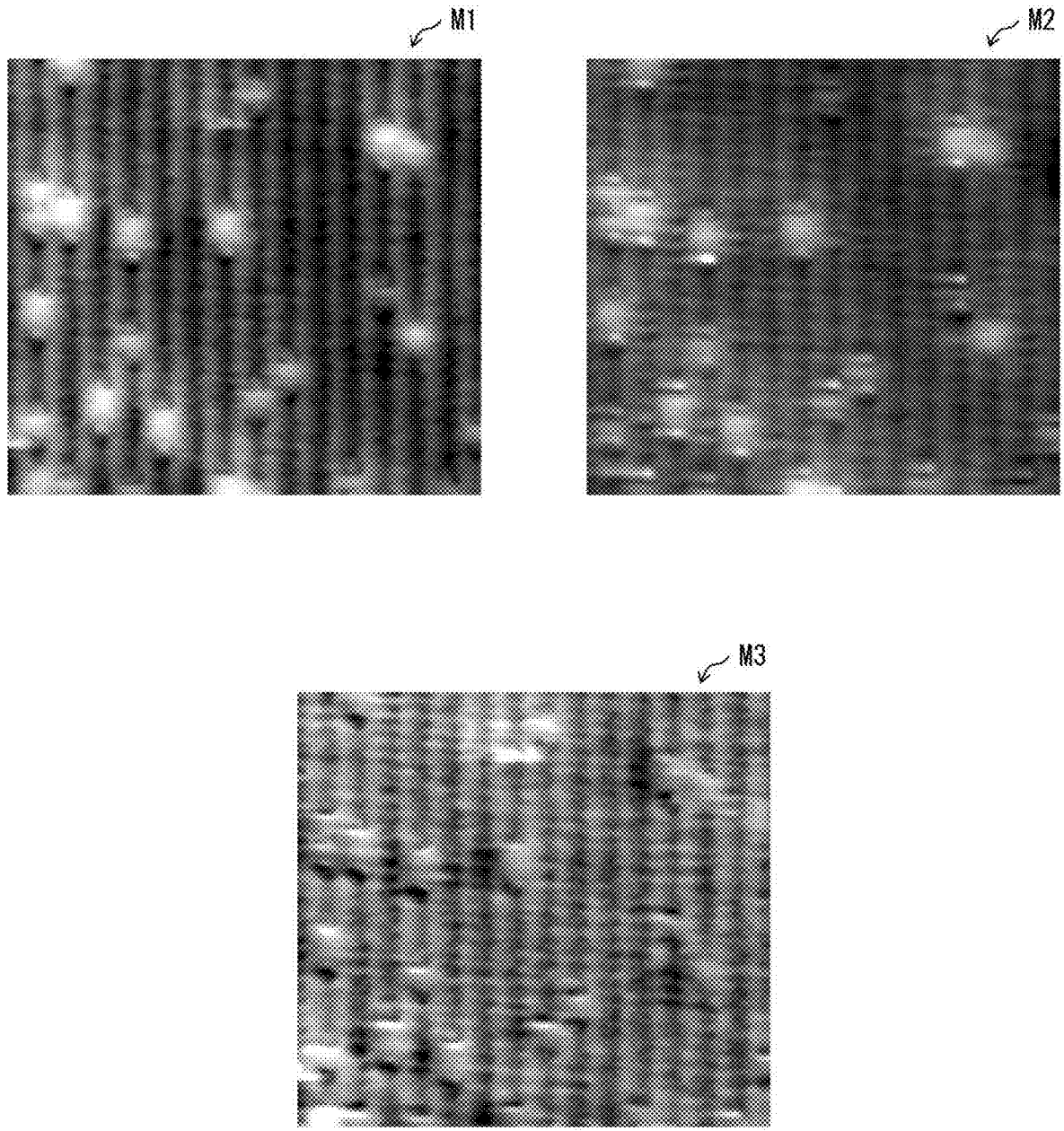
FIG. 17 shows: potential images that are obtained by measuring a potential at the surface of the sample while the cutoff frequency of the signal applied to the external terminal is switched; and an image that is obtained by analyzing the potential images and that shows a state of the surface of the sample.

The following description will discuss measurement results of the above-described state of the surface of the sample X, with reference to FIG. 17. FIG. 17 shows measured images M1 and M2, which are potential images of the surface of the sample X. The potential images M1 and M2 are measured by setting the frequency of the AC signal to be applied to the stage electrode 14 to 170 Hz, which is less than the cutoff frequency $f_c$ of the sample X, and to 2.3 MHz, which is not less than the cutoff frequency $f_c$ of the sample X, respectively. FIG. 17 also shows a measured image M3, which is obtained by calculating the potential difference between respective positions of the potential image of the measured image M1 and the potential image of the measured image M2.

It is clear from the measured image M3 that at each of the positions of the sample X, there is a potential difference between the potential image of the measured image M1 and the potential image of the measured image M2. This is because the frequency of the AC signal applied to the stage electrode 14 changes whether or not the band bending at each of the positions of the sample X is varied. As described above, the surface potential images of the sample X are measured while the frequency of the AC signal to be applied to the stage electrode 14 is switched between less than the cutoff frequency $f_c$ and not less than the cutoff frequency $f_c$. This makes it possible to measure the state of the local charge on the surface of the sample X.

Note that, even in the above-described vibration component measuring devices 2, 58, 62, and 64, it is possible to switch the frequency of the AC signal to be applied to the stage electrode 14 by switching between the first switches S1 and the second switches S2. Thus, the vibration component measuring devices 2, 58, 62, and 64 also can measure the state of the local charge on the surface of the sample X by a method identical to a measurement method with use of the vibration component measuring device 72.

Embodiment 7

<Another Example of Surface Charge Measuring Device>

Figure 18:
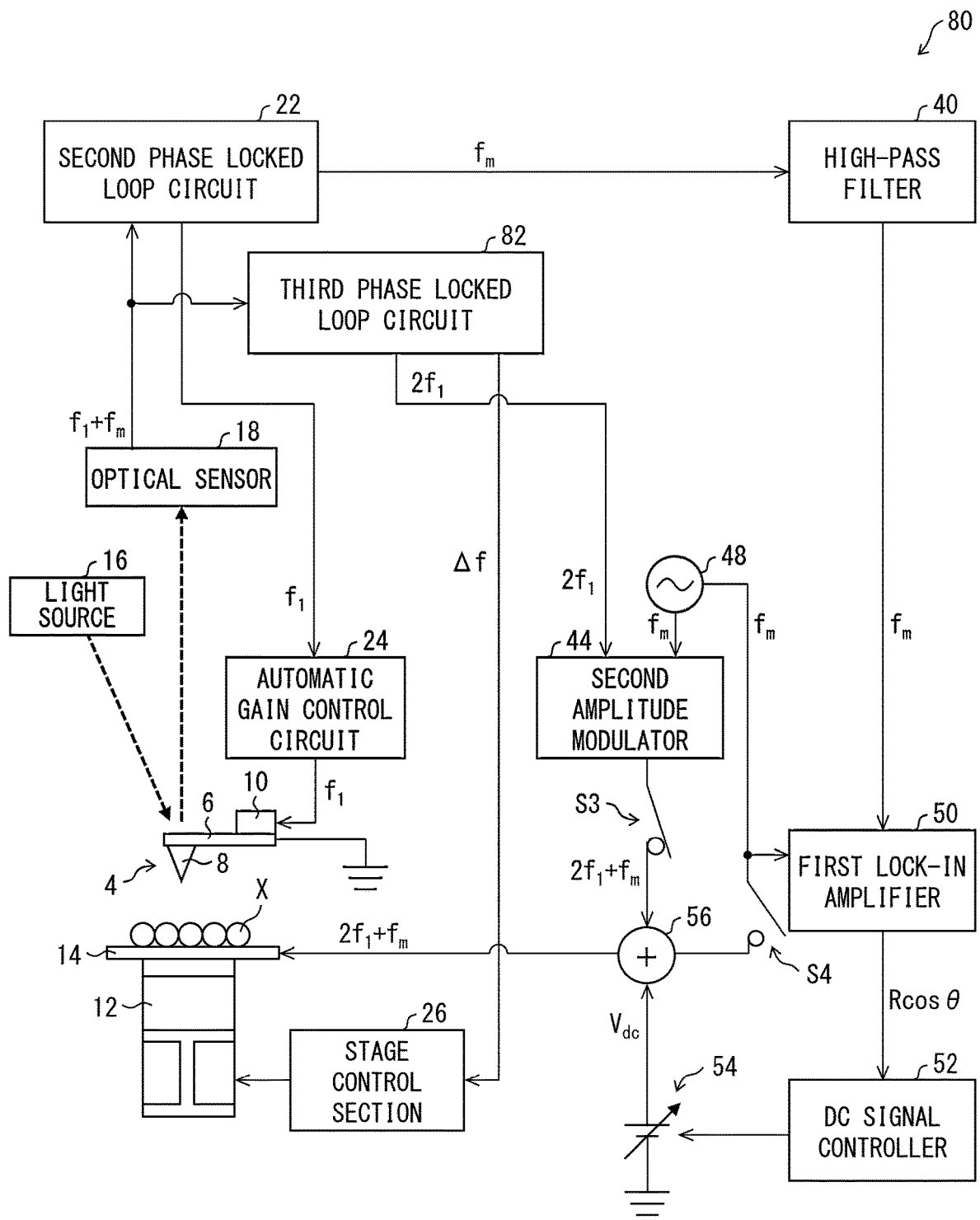
FIG. 18 is a block diagram for illustrating a configuration of a vibration component measuring device in accordance with Embodiment 7 and an operation of the vibration component measuring device.

FIG. 18 is a diagram for illustrating a configuration of a vibration component measuring device 80 in accordance with Embodiment 7 and an operation of the vibration component measuring device 80. The vibration component measuring device 80 in accordance with Embodiment 7 differs in configuration from the vibration component measuring device 72 in that the vibration component measuring device 80 includes a third phase locked loop circuit 82 in place of the third lock-in amplifier 70.

The third phase locked loop circuit 82 has the same configuration as the first phase locked loop circuit 20 described above, except that the third phase locked loop circuit 82 additionally includes a frequency demultiplier whose frequency dividing rate is 2. Therefore, the third phase locked loop circuit 82 outputs a signal that has a frequency $2f_1$ in addition to a signal that has a component of $\Delta f$, as compared with the first phase locked loop circuit 20. In Embodiment 7, the signal that has the frequency $2f_1$ outputted from the third phase locked loop circuit 82 is inputted to a second amplitude modulator 44.

Therefore, in Embodiment 7, the third phase locked loop circuit 82 functions also as a double frequency generator. Therefore, the vibration component measuring device 80 in accordance with Embodiment 7 may not include the doubler 46. Further, in order to generate a signal for causing a probe control section 10 to operate, a signal that has a frequency $f_1$ may be inputted to an automatic gain control circuit 24. This signal inputted is generated by a phase locked loop circuit that is different from the third phase locked loop circuit 82 and that includes the second phase locked loop circuit 22. Alternatively, it may be possible to input, to the automatic gain control circuit 24, a signal that is generated by an AC power source such as the above-described additional AC power source 68.

Except for the above, the vibration component measuring device 80 in accordance with Embodiment 7 has the same configuration as the vibration component measuring device 72 and carries out the same operation as the vibration component measuring device 72. Therefore, in Embodiment 7, as in the foregoing embodiments, the vibration component measuring device 80 can more quickly measure a frequency shift of vibration of a cantilever probe 4 in a case where a high-frequency signal is applied between a sample X and the cantilever probe 4.

Embodiment 8

<Vibration Component Measuring Device that Includes Micro-Vibration Mechanism>

Figure 19:
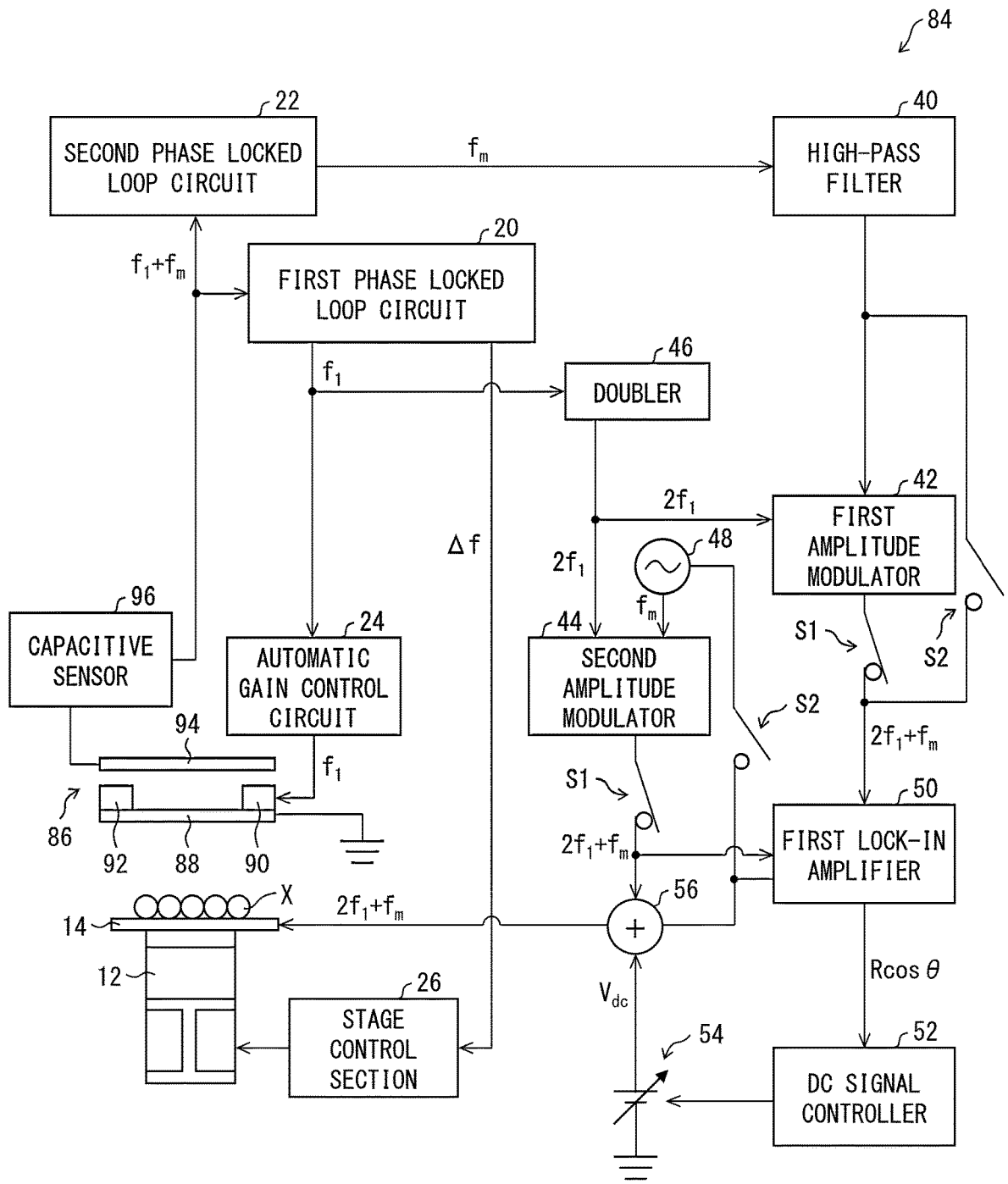
FIG. 19 is a block diagram for illustrating a configuration of a vibration component measuring device in accordance with Embodiment 8 and an operation of the vibration component measuring device.

FIG. 19 is a block diagram for illustrating a configuration of a vibration component measuring device 84 in accordance with Embodiment 8 and an operation of the vibration component measuring device 84. The vibration component measuring device 84 in accordance with Embodiment 8 differs in configuration from the vibration component measuring device 2 in that the vibration component measuring device 84 includes a micro-vibration detection mechanism 86 in place of a cantilever probe 4, a probe control section 10, a light source 16, and an optical sensor 18. The micro-vibration detection mechanism 86 includes a plate spring 88, a plate spring control section 90, a plate spring holding section 92, a fixed electrode 94, and a capacitive sensor 96.

The micro-vibration detection mechanism 86 includes the plate spring 88 as a vibration section. The plate spring 88 is a thin plate-like member that contains, for example, silicon or a silicon oxide film. Since the plate spring 88 is made of silicon or a silicon oxide film, fine processing of the plate spring 88 is easily carried out in production of the plate spring 88. The plate spring 88 may have a metal coating.

The plate spring 88 vibrates under the control of the plate spring control section 90 that serves as a vibration control section. For example, the plate spring control section 90 causes the plate spring 88 to vibrate at a vibration frequency that corresponds to a frequency of applied voltage. Specifically, in a case where the plate spring 88 has a resonant frequency which is a frequency $f_1$, a first AC signal that has the frequency $f_1$ is inputted to the plate spring control section 90.

The plate spring holding section 92 holds an end of the plate spring 88, and together with the plate spring control section 90, holds the plate spring 88. The fixed electrode 94 is arranged so as to be apart from the plate spring 88 and forms a capacitance between the fixed electrode 94 and the plate spring 88. The fixed electrode 94 is fixed at a position regardless of vibration of the plate spring 88. The capacitive sensor 96 measures the capacitance between the plate spring 88 and the fixed electrode 94, for example, by measuring electric charges that are accumulated in the fixed electrode 94.

It should be noted here that the plate spring 88 is vibrated by the plate spring control section 90 while the end of the plate spring 88 is held by the plate spring control section 90 and the plate spring holding section 92. Therefore, the vibration of the plate spring 88 causes periodic positional changes of a portion of the plate spring 88 in the vicinity of the center of the plate spring 88. This portion is directly held by neither the plate spring control section 90 nor the plate spring holding section 92. Thus, the vibration of the plate spring 88 periodically changes the distance between the plate spring 88 and the fixed electrode 94, which is arranged so as to be apart from the plate spring 88 and so as to be at a position where the fixed electrode 88 faces the plate spring 88.

As described above, the vibration of the plate spring 88 also causes periodic changes in magnitude of the capacitance that is formed by the plate spring 88 and the fixed electrode 94. Therefore, it is possible to measure a vibration component of the plate spring 88 by measuring, with use of the capacitive sensor 96, the magnitude of the capacitance that is formed by the plate spring 88 and the fixed electrode 94.

The capacitive sensor 96 calculates a vibration strength of the plate spring 88 for each vibration frequency of the plate spring 88, on the basis of the change in the capacitance. Further, the capacitive sensor 96 outputs a signal in accordance with a detection result. In Embodiment 8, the signal that is outputted by the capacitive sensor 96 is a signal obtained by replacing, with a signal strength for each frequency, the vibration strength of the plate spring 88 that is calculated, by the capacitive sensor 96, for each vibration frequency of the plate spring 88.

Except for the above, the vibration component measuring device 84 in accordance with Embodiment 8 has the same configuration as the vibration component measuring device 2, and carries out the same operation as the vibration component measuring device 2. Thus, the plate spring 88 vibrates at a vibration frequency $f_1$, and a second AC signal, which has a frequency $2f_1+f_m$, is applied between the plate spring 88 and the sample X. Accordingly, the capacitive sensor 96 outputs a signal that, like the signal shown in FIG. 2, has components at frequencies $f_1$, $f_1+f_m$, $2f_1+f_m$ and $3f_1+f_m$.

Therefore, in Embodiment 8, as in the foregoing embodiments, it is possible to measure a variation of the vibration component of the plate spring 88 by observing changes of an amplitude R and a phase θ in a side band of a modulated component of the vibration of the plate spring 88. Such a measurement can be carried out in the same manner as the above-described measurement carried out by the vibration component measuring device 2.

In Embodiment 8, as in the foregoing embodiments, the vibration component measuring device 84 can more quickly measure a frequency shift of the vibration of the plate spring 88 in a case where a high-frequency signal is applied between the sample X and the plate spring 88. Thus, the vibration component measuring device 84 can measure behavior etc. of the sample X by a method that is identical to a measurement method with use of the vibration component measuring device 2, in a case where an AC signal is applied between the sample X and the plate spring 88.

The vibration component measuring device 84 in accordance with Embodiment 8 can be used as an MEMS sensor that includes the micro-vibration detection mechanism 86 as a micro sensor. The vibration component measuring device 84 in accordance with Embodiment 8 can be also used as, for example, a vibration sensor for detecting vibration of a sample X, an acceleration sensor for detecting movement of a sample X, or a sound wave sensor for detecting sound waves from a sample X. In a case where the vibration component measuring device 84 is used as a sound wave sensor, the vibration component measuring device 84 can be used as, for example, a range sensor. In this case, after sound waves are emitted toward a sample X, the sound waves that are reflected by the sample X are detected with use of the micro-vibration detection mechanism 86.

In Embodiment 8, measurement of the vibration component of the plate spring 88 is carried out by measuring the capacitance between the plate spring 88 and the fixed electrode 94 with use of the fixed electrode 94 and the capacitive sensor 96. However, the measurement of the vibration component of the plate spring 88 is not limited to this configuration, but may be carried out with use of an optical fiber sensor.

Further, the plate spring 88 may include silicon that has a piezoresistive effect, crystal such as quartz that has a piezoelectric effect, or the like. In this case, the measurement of the vibration component of the plate spring 88 may be carried out by measuring a resistance value of the silicon that has a piezoresistive effect or by measuring electromotive force which occurs in the crystal that has a piezoelectric effect.

The above-described method for measuring the vibration component of the plate spring 88 differs from an optical lever method which employs the light source 16, the optical sensor 18, and the like. Therefore, it is not necessary, for example, to ensure an optical path from the light source 16 to the optical sensor 18. Accordingly, the above-described method of measuring the vibration component of the plate spring 88 makes it possible to further reduce a size of the vibration component measuring device 84.

The present invention is not limited to the embodiments, but can be altered by a skilled person in the art within the scope of the claims. The present invention also encompasses, in its technical scope, any embodiment derived by combining technical means disclosed in differing embodiments.

REFERENCE SIGNS LIST

2, 58, 62, 64, 66, 72, 80, 84 vibration component measuring device, 4 cantilever probe (vibration section), 10 probe control section (vibration control section), 12 stage, 14 stage electrode, 16 light source, 18 optical sensor, 20 first phase locked loop circuit, 22 second phase locked loop circuit, 24 automatic gain control circuit, 26 stage control section, 42 first amplitude modulator, 44 second amplitude modulator, 46 doubler, 48 AC power source, 50 first lock-in amplifier, 52 DC signal controller, 54 DC power source, 56 adder, 60 second lock-in amplifier, 68 additional AC power source, 70 third lock-in amplifier, 82 third phase locked loop circuit, 86 micro-vibration detection mechanism, 88 plate spring (vibration section), 90 plate spring control section (vibration control section), 92 plate spring holding section, 94 fixed electrode, 96 capacitive sensor, S1 first switch, S2 second switch, S3 third switch, and S4 fourth switch.

The invention claimed is:

1. A vibration component measuring device comprising:
   a vibration section;
   a first AC signal generator configured to generate a first AC signal;
   a second AC signal generator configured to generate a second AC signal having a frequency which is (a) more than one time and less than two times or (b) more than two times and less than three times as high as a frequency of the first AC signal;
   a signal applying section configured to apply at least the second AC signal between the vibration section and a sample;
   a vibration control section configured to cause the vibration section to vibrate on the basis of the first AC signal; and
   a measuring section configured to measure a varying component of vibration of the vibration section, the varying component being varied by an interaction between the vibration section and the sample.

2. The vibration component measuring device as set forth in claim 1, further comprising
   a reference AC generator configured to generate a reference AC signal hang a lower frequency than the first AC signal,
   the second AC signal having (a) a frequency obtained by adding a frequency of a reference signal to a frequency twice the first AC signal or (b) a frequency obtained by subtracting the frequency of the reference AC signal from a frequency twice the frequency of the first AC signal.

3. The vibration component measuring device as set forth in claim 2, wherein
   the second AC signal generator includes:
      a double frequency generator configured to generate a double frequency signal having the frequency twice the frequency of the first AC signal; and
      a second amplitude modulator configured to generate the second AC signal from the double frequency signal and the reference AC signal.

4. The vibration component measuring device as set forth in claim 2, wherein
   the signal applied between the vibration section and the sample is switched between the second AC signal and the reference AC signal.

5. The vibration component measuring device as set forth in claim 2, wherein
   the measuring section includes:
      a measurement signal generator configured to detect a vibration component of the vibration section and generate a measurement signal on the basis of the vibration component; and
      a first lock-in amplifier configured to calculate the varying component by comparing, with the reference signal which is generated on the basis of the reference AC signal, a comparison signal which is generated on the basis of the measurement signal.

6. The vibration component measuring device as set forth in claim 5, wherein:
the measurement signal is generated on the basis of a difference between a vibration frequency of the vibration section and the frequency of the first AC signal; and
the vibration component corresponds to a difference between the frequency of the reference signal and the frequency of the comparison signal.

7. The vibration component measuring device as set forth in claim 6, wherein
the measurement signal generator includes a phase locked loop circuit configured to generate the measurement signal.

8. The vibration component measuring device according to claim 5, wherein:
the measurement signal is generated on the basis of a difference between an amplitude of the vibration of the vibration section and an amplitude of the first AC signal; and
the vibration component corresponds to a difference between an amplitude of the reference signal and an amplitude of the comparison signal.

9. The measurement signal generator as set forth in claim 8, wherein
the measurement signal generator includes a second lock-in amplifier configured to generate the measurement signal.

10. The vibration component measuring device as set forth in claim 5, further comprising:
a stage configured to support the sample; and
a stage control section configured to control a position of the vibration section relative to the sample, by controlling a position of the stage,
the stage control section controlling the position of the stage on the basis of the measurement signal.

11. The vibration component measuring device as set forth in claim 5, wherein
the measuring section further includes a first amplitude modulator configured to generate the comparison signal from (a) the double frequency signal having a frequency twice the first AC signal and (b) the measurement signal.

12. The vibration component measuring device as set forth in claim 5, wherein:
the measurement signal generator detects a vibration frequency of the vibration section; and
the first AC signal generator generates the first AC signal on the basis of the vibration frequency that is detected by the measurement signal generator.

13. The vibration component measuring device as set forth in claim 12, wherein
the measurement signal generator and the first AC signal generator are provided with a common phase locked loop circuit.

14. The vibration component measuring device as set forth in claim 13, further comprising
an automatic gain control circuit configured to control a gain of the first AC signal, which has been outputted from the phase locked loop circuit.

15. The vibration component measuring device as set forth in claim 1, further comprising
a DC signal generator configured to generate a DC signal,
the signal applying section applies, between the vibration section and the sample, a signal obtained by adding a voltage of the DC signal to the second AC signal.

16. The vibration component measuring device as set forth in claim 15, wherein
the DC signal generator controls the voltage of the DC signal on the basis of the varying component.

17. The vibration component measuring device as set forth in claim 1, wherein
the vibration section is a cantilever probe.

18. A Kelvin probe force microscope comprising
a vibration component measuring device recited in claim 17.

19. The vibration component measuring device as set forth in claim 1, wherein
the vibration section is a plate spring.

20. A method for measuring a vibration component, comprising the steps of:
generating a first AC signal for causing a vibration section to vibrate;
generating a second AC signal having a frequency which is (a) more than one time and less than two times or (b) more than two times and less than three times as high as a frequency of the first AC signal; and
measuring a varying component of vibration of the vibration section, the varying component being varied due to an interaction between the vibration section and a sample by causing the vibration section to vibrate on the basis of the first AC signal concurrently with application of the second AC signal between the vibration section and the sample.

* * * * *